(12) United States Patent
Konishi et al.

(10) Patent No.: US 8,196,160 B2
(45) Date of Patent: Jun. 5, 2012

(54) TELEVISION RECEIVER, SERVER, OPERATIONAL SYSTEM OF THE TELEVISION RECEIVER AND OPERATIONAL PROGRAM OF THE TELEVISION RECEIVER FOR DETECTING AND CORRECTING UNINTENDED CONNECTION

(75) Inventors: Kenji Konishi, Chiba (JP); Tomohiko Ozeki, Ichihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 635 days.

(21) Appl. No.: 12/261,894

(22) Filed: Oct. 30, 2008

(65) Prior Publication Data

US 2009/0113506 A1    Apr. 30, 2009

(30) Foreign Application Priority Data

Oct. 31, 2007    (JP) .................................. 2007-282792

(51) Int. Cl.
*H04N 7/16* (2011.01)
*H04N 7/173* (2011.01)
*G06F 7/04* (2006.01)
*G06F 21/00* (2006.01)
*G06F 15/16* (2006.01)
*G06F 11/00* (2006.01)

(52) U.S. Cl. ............ 725/30; 725/25; 725/109; 725/110; 725/114; 725/116; 725/131; 726/4; 726/16; 726/30; 713/182; 709/227; 714/46

(58) Field of Classification Search .................... 725/30, 725/25, 109, 110, 114, 116, 131; 726/4, 726/16, 30; 713/182; 709/227; 714/46
See application file for complete search history.

(56) References Cited

U.S. PATENT DOCUMENTS

| 2004/0122955 | A1* | 6/2004 | Park .............................. 709/227 |
| 2005/0222962 | A1* | 10/2005 | Buckle ............................ 705/67 |
| 2007/0162931 | A1* | 7/2007 | Mickle et al. ................... 725/37 |

FOREIGN PATENT DOCUMENTS

JP    2002-92206 A    3/2002

* cited by examiner

*Primary Examiner* — Hoang-Vu A Nguyen-Ba
(74) *Attorney, Agent, or Firm* — Birch, Stewart, Kolasch & Birch, LLP

(57) ABSTRACT

Provided are a television receiver, server, operational system of the television receiver and operational program of the television receiver capable of detecting and correcting unintended connection in case that the connection is established, and facilitating the operation of the television receiver from the outside. A television receiver 110 is operable via a network, and has a notifying section 115 that notifies a user of key information for specifying an operational request of the television receiver 110, and a receiver-side transmitting/receiving section 114 that receives connection confirmation information specific to temporary connection when an external terminal 150 and the television receiver 110 are temporarily connected based on the key information, where the notifying section 115 notifies the user of the received connection confirmation information so as to enable the external terminal 150 to operate the television receiver 110 when the connection confirmation information is confirmed between the user and an operator.

17 Claims, 18 Drawing Sheets

| RECEPTION NUMBER | MAC ADDRESS |
|---|---|
| 1111 | 00:11:22:33:44:55 |
| 2222 | 77:88:aa:bb:cc:dd |
| 3333 | 00:aa:11:bb:22:cc |
| 4567 | 9a:8b:7c:d6:e5:f4 |
| abcd | 5b:1f:3d:44:ac:de |
| jk89 | 0f:33:... |
FIG. 8
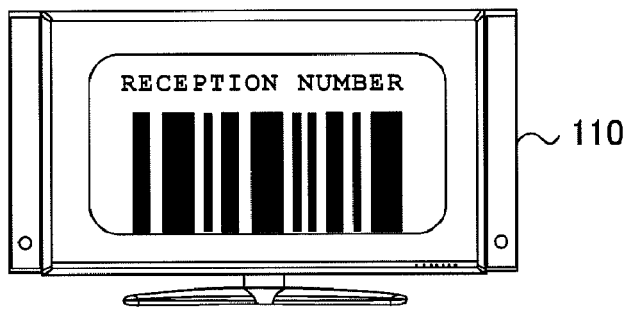
FIG. 9A
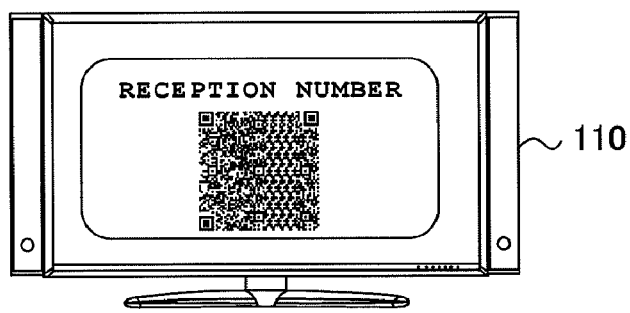
FIG. 9B

| OPERATOR ID | NAME | IP ADDRESS |
|---|---|---|
| A001 | TARO YAMADA | 192.168.10.100 |
| A002 | JIRO HAYASHI | 192.168.10.101 |
| A005 | SABURO SATO | 192.168.10.105 |
| S007 | SHIRO YOSHIDA | 192.168.10.145 |
| S010 | GORO ITO | 192.168.10.130 |

FIG. 10

| RECEPTION NUMBER | OPERATOR ID | REFERENCE NUMBER |
|---|---|---|
| 2222 | S007 | T579 |
| jk89 | S022 | V135 |
| 3333 | S010 | M468 |
| 4567 | A005 | P841 |
| m0n1 | S015 | |

FIG. 11

TELEVISION RECEIVER, SERVER, OPERATIONAL SYSTEM OF THE TELEVISION RECEIVER AND OPERATIONAL PROGRAM OF THE TELEVISION RECEIVER FOR DETECTING AND CORRECTING UNINTENDED CONNECTION

TECHNICAL FIELD

The present invention relates to a television receiver, server, operational system of the television receiver and operational program of the television receiver enabling operations of the television receiver using an external terminal.

BACKGROUND ART

In recent years, digital TV broadcasts have started to enable images and sounds with high resolution and high definition to be watched and listened with a television receiver. Further, at almost the same time, the television receiver has proceeded to support networks. With the progress, functions of the television receiver have increased. As a result, the operation and each setting method of the television receiver have been complicated, thereby increasing the number of inquiries to customer response centers prepared by a manufacturer and the like.

In general, an operator receiving an inquiry first asks a user to operate a remote controller, grasps a cause of conditions and situation of the television receiver of the user, and then, encourages the user to operate again the remote controller so as to resolve the problem.

However, the operational method has been complicated as described above, there are many cases that a user cannot operate as instructed by an operation, and problems have occurred that discomfort feeling is imposed on the user as a result and that the operator cannot resolve trouble of the user immediately. Therefore, such a method is proposed that an operator operates an electric device of a user using a terminal directly or indirectly via a communication network using a device connected to the communication network such as the Internet and the like, and thereby intends to resolve trouble (see Japanese Laid-Open Patent Publication No. 2002-92206).

One of problems to solve by the method as described in Japanese Laid-Open Patent Publication No. 2002-92206 is to specify a device of a user making a call on the customer response center side. A lot of terminals including personal computers, cellular telephones and the like are connected to the communication network typified by the Internet. The customer response center is capable of immediately finding and operating a device owned by a user making a call among the terminals.

To identify the user who makes a call, a user ID is used in the above-mentioned conventional example. Described as the ID i.e. identification information are a telephone number of the user's house, user's name, address, e-mail address, password and the like.

DISCLOSURE OF INVENTION

Problems to be Solved by the Invention

However, Japanese Laid-Open Patent Publication No. 2002-92206 does not disclose specific means, procedures and the like for an external terminal to connect to a support target device of a user via the network. Ordinarily, to connect to a device in the user's house via the network using the above-mentioned information, advance registration is required to beforehand match the identification information of the user with the device owned by the user. Thus, the operator cannot specify the user owned device as a target among many devices connected on the communication network without the advance registration.

However, there are many cases that a user who has not made advance registration makes a call to the customer response center. Accordingly, the conventional method requiring advance registration cannot respond to inquiries of users who have not made user registration. It is thought that the user makes user registration at this point, but the inquiring user is forced to make registration before asking what to inquire, and feels it sufficiently burdensome. Further, specific information such as a MAC address or the like of the device is required to make registration, and the user has to check the information. Therefore, there is a possibility that registration is not established when the user cannot confirm the MAC address or the like.

Further, when a plurality of network connectable devices exists in the user's house, it is not possible to distinguish the devices from one another using the typical identification information, and the target device cannot be identified. Moreover, the above-mentioned identification information may be personal information, and therefore, is the information that the user is reluctant to tell to another person as possible from the viewpoint of privacy. When the identification information is leaked to a malicious third party, there is a risk that the party steals glances at the information of the user and/or the information of home-use devices targeted for service by sniffing and/or spoofing.

With respect to this problem, such a method is considered that a server issues a one-time password in response to a request from a television receiver, the television receiver displays the password, and that the need of advance registration is thereby eliminated. However, when this method is performed, such a problem may occur that unintended connection arises by user's wrong saying, operator's wrong hearing, wrong input or the like when a one-time password is communicated between the user and operator.

The present invention is carried out in view of the aforementioned circumstances, and it is an object of the invention to provide a television receiver, server, operational system of the television receiver and operational program of the television receiver capable of detecting and correcting unintended connection in case that the connection is established, and facilitating the operation of the television receiver from the outside.

Means for Solving the Problem (1) In order to attain the above-mentioned object, a television receiver according to the invention is a television receiver operable via a network, and characterized by having a notifying section that notifies a user of key information for specifying an operational request of the television receiver, and a receiver-side transmitting/receiving section that receives connection confirmation information to confirm temporary connection when the television receiver and the outside are temporarily connected based on the key information, where the notifying section notifies the user of the received connection confirmation information so as to enable the television receiver to be operated from the outside based on the connection confirmation information notified to the user.

Thus, the television receiver of the invention notifies a user of key information. The notified user is capable of informing an operator of the key information using another communication means such as a telephone or the like. Then, the operator is capable of temporarily connecting to the television receiver using the key information via the server from the outside (external terminal or the like). When temporary connection is made, since the television receiver notifies the user of the connection confirmation information, the user is able to check whether temporary connection is desirable connection. When the connection is confirmed to be proper connection by the connection confirmation information, the operator is allowed to operate the television receiver from the outside (external terminal or the like). In addition, the connection confirmation information is information to confirm temporary connection, and includes, for example, operator ID, external terminal ID, and temporary connection ID. The connection confirmation information is information determined in a one-to-one correspondence with temporary connection in confirming.

According to the above-mentioned television receiver, for example, the server issues a one-time password in response to a request from the television receiver to enable the operator to make initial setting without advance registration. In this case, even when unintended connection is established by user's wrong saying, operator's wrong hearing, wrong input or the like, it is possible to immediately find the unintended connection to correct. As a result, it is possible to prevent unintended connection from occurring, and the television receiver becomes easy to operate from the outside.

(2) Further, the television receiver according to the invention is characterized by further having an operational section that receives a confirmation operation made by the user confirming the connection confirmation information with the operator intending to operate the television receiver from the outside, and a receiver-side control section which establishes real connection with the outside when the confirmation operation is made, and executes operational instructions received from the outside.

Thus, the user is capable of confirming the connection confirmation information with the operator, and inputting the confirmation to the television receiver. As a result, it is possible to operate the television receiver from the outside (external terminal or the like). In addition, the real connection is connection after confirming that the connection is valid.

(3) Furthermore, the television receiver according to the invention is characterized by further having a request generating section that generates request information to request the key information to the server in response to a predetermined operation by the user, where the receiver-side transmitting/receiving section transmits the request information to the server, while receiving the key information generated by the server, and based on the received key information, the temporary connection with the outside is established.

Thus, the television receiver of the invention notifies the user of the key information received from the server as a response to the request. By this means, the user is capable of informing the operator of the key information with ease using a telephone or the like. Then, the operator is capable of accessing the television receiver of the user from the outside (external terminal or the like) using the key information to operate. As a result, for example, without making user registration, it is possible to operate the television receiver from the outside (external terminal or the like) to set. Further, the user is not loaded with a burden in setting. Then, even when a plurality of network connectable devices exists in the user's house, it is possible to distinguish the devices from one another and remotely operate the television receiver targeted for service with accuracy.

(4) Still furthermore, the television receiver according to the invention is characterized by further having a key information generating section that generates the key information in response to a predetermined operation by the user, where the receiver-side transmitting/receiving section transmits the generated key information to the server, and based on the generated key information, the temporary connection with the outside is established.

Thus, the television receiver of the invention transmits the generated key information to the server while notifying the user of the key information. By this means, for example, the user is capable of informing the operator of the key information with ease using a telephone or the like. Then, the operator is capable of accessing the television receiver of the user from the outside (external terminal or the like) using the key information to operate without advance registration.

(5) Further, it is a feature of the television receiver according to the invention that the receiver-side transmitting/receiving section transmits the key information input by the user to the server, and that the temporary connection with the outside is established corresponding to an external terminal ID specified by the input key information.

Thus, the television receiver of the invention is capable of receiving an input of the key information informed from the operator, and connecting to the outside (external terminal or the like) via the server using the input key information. By this means, the user inputs the key information heard from the operator using a telephone or the like, and is able to make the operator operate the television receiver.

(6) Moreover, a server according to the invention is a server enabling a television receiver to be operated from the outside via a network, and is characterized by having a temporary connection establishing section that establishes temporary connection between the outside and a television receiver corresponding to key information based on the key information when receiving the key information to operate the television receiver, a server-side transmitting/receiving section that transmits connection confirmation information to confirm the temporary connection to the television receiver corresponding to the key information, and a real connection establishing section which receives confirmation finish information indicating that the connection confirmation information has been confirmed, and when determining that the connection is valid by the confirmation finish information, switches the temporary connection between the outside and the television receiver corresponding to the key information to real connection to establish the real connection.

Thus, the server of the invention establishes temporary connection when receiving the key information from the outside (external terminal or the like), and transmits connection confirmation information to a television receiver corresponding to the key information. By this means, the user informed of the connection confirmation information by the television receiver is capable of confirming that the connection with the operator is valid. Then, the server of the invention receives confirmation finish information input by the operator or user, and is capable of switching the temporary connection to real connection. As a result, it is possible to prevent unintended connection from occurring, and the operator is capable of operating the desired television receiver.

(7) Further, a server according to the invention is a server enabling a television receiver to be operated from the outside via a network, and is characterized by having a temporary connection establishing section that establishes temporary connection between the outside and a television receiver that transmits key information based on the key information when receiving the key information to operate the television receiver, a server-side transmitting/receiving section that transmits connection confirmation information to confirm the temporary connection to the television receiver transmitting the key information, and a real connection establishing section which receives confirmation finish information generated after confirming the connection confirmation information, and when determining that the connection is valid by the confirmation finish information, switches the temporary connection between the outside and the television receiver transmitting the key information to real connection to establish the real connection.

Thus, the server of the invention establishes temporary connection when receiving the key information from a television receiver, and transmits connection confirmation information to the television receiver. By this means, the user informed of the connection confirmation information by the television receiver is capable of confirming that the connection with the operator is valid. Then, the server of the invention receives confirmation finish information input by the operator or user, and is capable of switching the temporary connection to real connection when the connection is valid. As a result, it is possible to prevent unintended connection from occurring, and the operator is capable of operating the desired television receiver.

(8) Furthermore, the server according to the invention is characterized by further having a temporary connection information storing section that associates the received key information with the connection confirmation information to be transmitted to store as temporary connection information when the temporary connection is made, and a real connection information storing section that associates the received key information with the connection confirmation information to be transmitted to store as real connection information when the real connection is made, where when receiving the confirmation finish information, the real connection establishing section deletes the temporary connection information from the temporary connection information storing section, and stores the real connection information in the real connection information storing section.

Thus, the server of the invention stores the information of the television receiver and the outside (external terminal or the like) while distinguishing whether the connection therebetween is in a temporary connection state or a real connection state, and manages these pieces of information. By this means, management of temporary connection and real connection is made easy.

(9) Still furthermore, the server according to the invention is characterized in that the temporary connection information storing section stores a corresponding temporary connection ID for each of the temporary connection information, and that the real connection establishing section transmits the temporary connection information to a television receiver identified by the receiver ID as the connection confirmation information. It is thereby possible to use the temporary connection ID as the connection confirmation information. Further, by associating with the temporary connection ID, it is made ease extracting the temporary connection information.

(10) Moreover, the server according to invention is characterized by further having a key information storing section that stores key information in association with the receiver ID to identify the receiver, and an operator ID storing section that stores an operator ID in association with an external terminal ID to identify an external terminal as the outside, where the temporary connection establishing section refers to the key information storing section to establish temporary connection between the television receiver and the external terminal, and transmits the operator ID as the connection confirmation information to the television receiver identified by the receiver ID by referring to the operator ID storing section.

By this means, the server receiving the key information and the external terminal ID is capable of extracting the receiver ID and operator ID associated with the key information and the external terminal ID. Then, the server is capable of transmitting the operator ID to the receiver identified by the receiver ID. In addition, the operator ID is information to identify an operator, and includes an operator number assigned for each operator, name of the operator and the like.

(11) Further, an operational system of a television receiver according to the invention is a television receiver operational system comprised of an element group of a television receiver, a server, and outside, and is characterized in that the server has a temporary connection establishing section that establishes temporary connection between the outside and a television receiver corresponding to key information based on the key information when receiving the key information, a real connection establishing section which receives confirmation finish information to confirm the temporary connection, and when determining that the connection is valid by the confirmation finish information, switches the temporary connection to real connection to establish the real connection, and a server-side transmitting/receiving section that transmits the connection confirmation information to the receiver, the television receiver has a notifying section that notifies a user of the connection confirmation information received in the temporary connection, and that when the connection confirmation information is confirmed between the user and the operator, and the server receives confirmation finish information transmitted from the television receiver or the outside and determines that the connection is valid by the confirmation finish information, the server switches the temporary connection to real connection to establish the real connection.

Thus, in the operational system of a television receiver of the invention, the server receiving key information establishes temporary connection, and transmits connection confirmation information to the television receiver, and the television receiver informs a user of the connection confirmation information. The user confirms that the connection with an operator is valid by the connection confirmation information, and the server receives connection finish information input by the user or the operator, and switches the temporary connection to real connection. As a result, unintended connection is prevented from occurring, and the operator is capable of operating the desirable television receiver.

(12) Furthermore, an operational program of a television receiver according to the invention is a program executed by a server that mediates connection between a television receiver and outside, and is characterized by including temporary connection establishing processing for establishing temporary connection between the outside and a television receiver based on key information when the server receives the key information to operate the television receiver, transmitting processing for transmitting connection confirmation information to confirm the temporary connection to the television receiver corresponding to the key information, and real connection establishing processing for receiving confirmation finish information generated after confirming the connection confirmation information, and when determining that the connection is valid by the connection finish information, switching the temporary connection between the outside and the television receiver to real connection to establish the real connection.

Thus, the operational program of a television receiver of the invention makes the server establish temporary connection when the server receives key information, and further makes a television receiver corresponding to the key information transmit connection confirmation information. By this means, a user notified of connection confirmation information by the television receiver is capable of confirming that the connection with the operator is valid. Then, the operational program of a television receiver of the invention enables the server to switch the temporary connection to real connection when the server receives the confirmation finish information input by the user or the operator. As a result, unintended connection is prevented from occurring, and the operator is capable of operating the desirable television receiver.

ADVANTAGEOUS EFFECT OF THE INVENTION

According to the invention, a user notified of connection confirmation information by the television receiver is capable of confirming that the connection with the operator is valid. As a result, unintended connection is prevented from occurring, and the operator is capable of operating the desirable television receiver.

BRIEF DESCRIPTION OF DRAWINGS

FIG. 8 is a diagram showing an example of a table of key information;

FIGS. 9A and 9B are views showing aspects of a television receiver notifying a reception number using a barcode;

FIG. 10 is a diagram showing an example of a table of operator ID;

FIG. 11 is a diagram showing an example of a table of temporary connection information;

DESCRIPTION OF SYMBOLS

Figure 1:
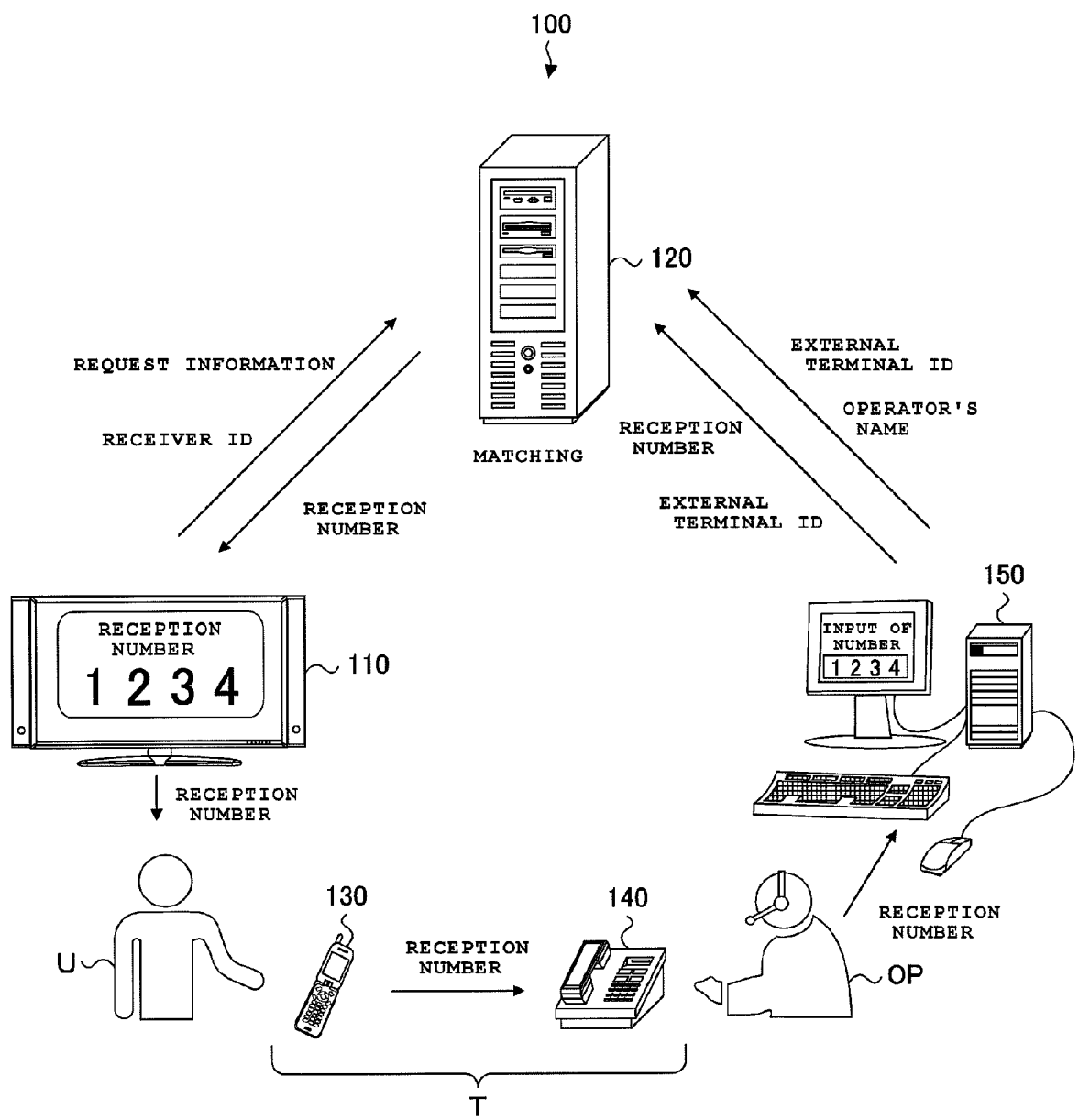
FIG. 1 is a conceptual diagram illustrating a configuration of a television receiver operational system according to Embodiment 1.

100, 200, 300, 400 Television receiver operational system
110, 210, 310 Television receiver
111, 151 Operational section
112, 356 Request generating section
113 Receiver-side storing section
114 Receiver-side transmitting/receiving section
115 Notifying section (display screen)
117, 357 Authentication section
118 Receiver-side confirmation processing section
119 Receiver-side control section
120, 220 Server
121 Server-side transmitting/receiving section
122, 216, 458 Key information generating section
123 Checking section
124 Key information storing section
125 Temporary connection establishing section
126 Temporary connection information storing section
127 Operator ID storing section
128 Real connection establishing section
129 Real connection information storing section
129a Server-side control section
130 Cellular telephone (user-side conveyance device)
140 Operator-side conveyance device
150, 350, 450 External terminal
152, 452 Notifying section (display screen)
153 External terminal-side storing section
154 External terminal-side transmitting/receiving section
155 External terminal-side confirmation processing section
156 External terminal-side control section
315 Display section
358 Display screen (notifying section)
OP Operator
U User

BEST MODE FOR CARRYING OUT THE INVENTION

Embodiments of the present invention will specifically be described below with reference to accompanying drawings. To make it easy understanding descriptions, the same structural elements are assigned the same reference numerals in the drawings to omit redundant descriptions.

[Embodiment 1]
(Configuration of an Operational System)

Figure 2:
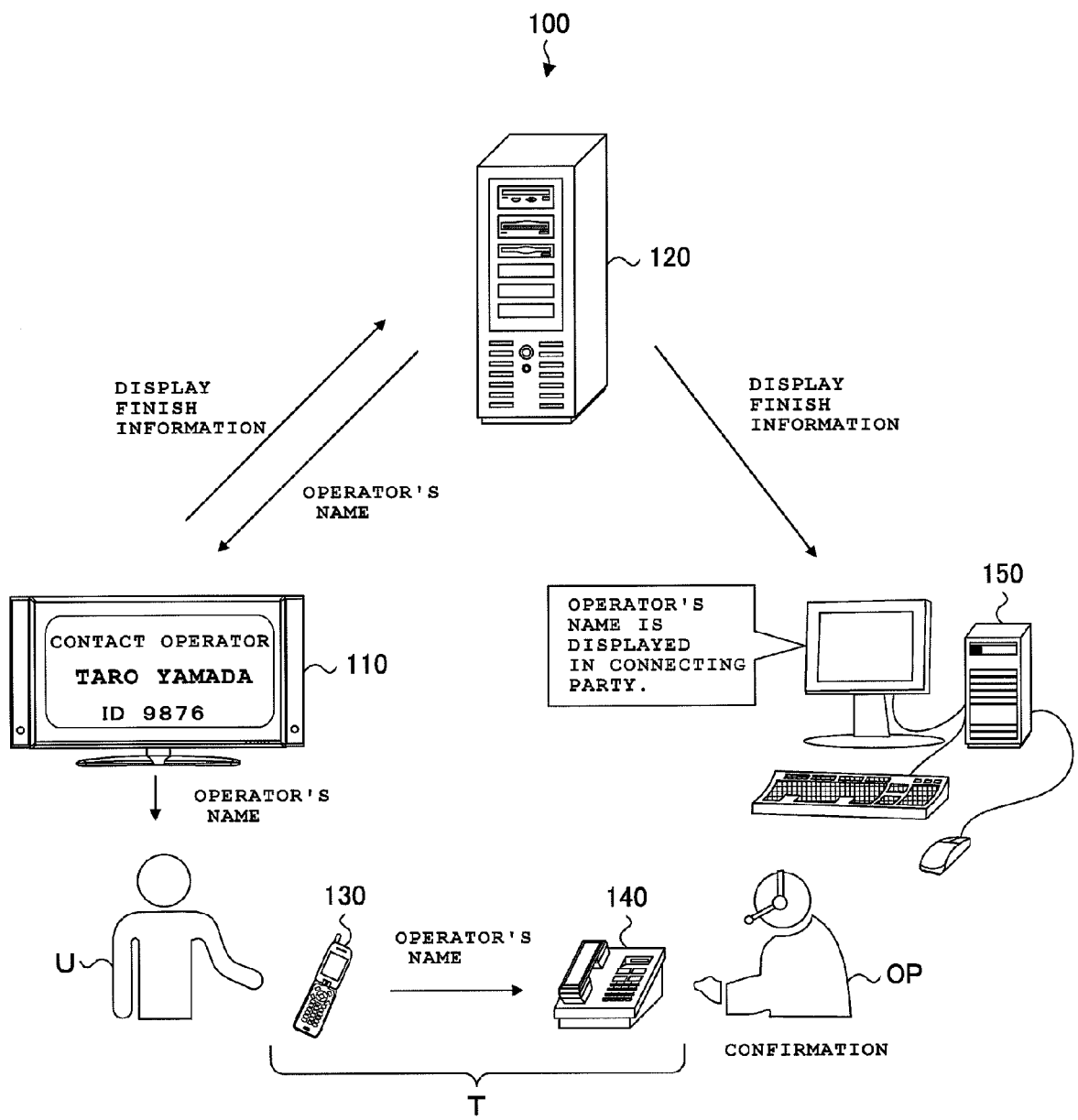
FIG. 2 is another conceptual diagram illustrating the configuration of the television receiver operational system according to Embodiment 1.

FIGS. 1 and 2 are conceptual diagrams illustrating a configuration of a television receiver operational system 100. The television receiver operational system 100 is configured as an apparatus group (element group) including a television receiver 110 and a server 120. The television receiver 110, server 120 and external terminal 150 are connectable via a network. The arrows shown in FIGS. 1 and 2 indicate conveyance of principal information of the invention. FIG. 1 shows the flow of information up to temporary connection, and FIG. 2 shows the flow of information from temporary connection to real connection. In addition, in the other figures, only principal information is shown for conveyance of information, and other information is omitted.

In addition, the temporary connection is a state before the real connection, and more specifically, is a state in which the server 120 manages, as a group, the television receiver 110 of a user U and external terminal 150 of an operator OP each connected to the server 120 via a network, but the external terminal 150 of the group is not able to operate the television receiver 110 of the same group. Further, the real connection is a state in which the server 120 manages the television receiver 110 of a user U and external terminal 150 of an operator OP each connected to the server 120 via a network as a group, and the external terminal 150 of the group is allowed to operate the television receiver 110 of the same group.

The television receiver 110 is a model of television receiver capable of connecting to the server 120 via a network. The television receiver 110 has a tuner, and receives radio signals for television to enable viewing of programs, while being connected to the network to function also as a terminal. The network is an ordinary network including cable networks and wireless networks. For example, the television receiver operational system 100 is used in cases that a user U is not able to set the television receiver 110 in starting to use the television, and calls an operator OP using a cellular telephone 130.

When the user U presses a help button, the television receiver 110 obtains key information from the server 120, and displays the key information on the screen. The key information is a code functioning as key information capable of being shared between the user U and operator OP, and is unique to the user U and operator OP. The key information is information for specifying an operational request of the television receiver. For example, the key information is formed of 4-digit alphanumeric characters. The user U informs the operator OP of the displayed key information using conveyance means T such as a telephone or the like. The operator OP accesses the server 120 from the external terminal 150, and transmits the key information to the server 120. The server 120 determines whether the key information obtained from the external terminal 150 agrees with first issued key information, and when the key information agrees with each other, makes temporary connection between the external terminal 150 and television receiver 110.

When the temporary connection is made, since the television receiver 110 notifies the user U of connection confirmation information, the user U is capable of confirming whether the temporary connection is desirable connection. When it is confirmed that the connection is valid by the connection confirmation information, the operator OP is able to operate the television receiver 110 using the external terminal 150. A configuration of each section will be described below. In addition, the connection confirmation information is identification information specified by each operation performed from the outside. Generally, the information is a single piece of information determined for the operator OP, but may not be a single piece of information for the operator OP.

Figure 3:
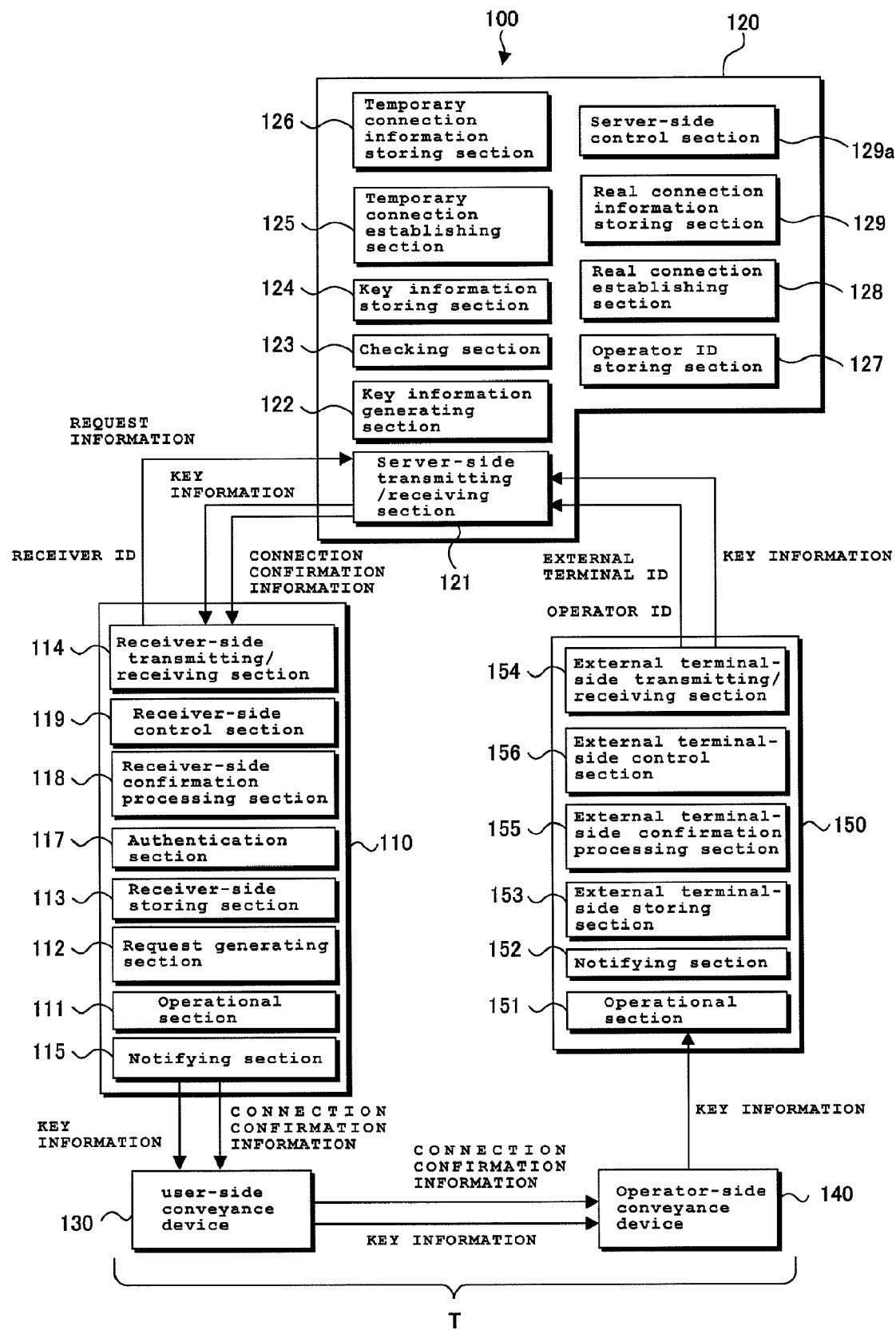
FIG. 3 is a block diagram illustrating a configuration of each section in the television receiver operational system according to Embodiment 1.

FIG. 3 is a block diagram illustrating a configuration of each section of the television receiver operational system 100. The television receiver 110 has an operational section 111, request generating section 112, receiver-side storing section 113, receiver-side transmitting/receiving section 114, notifying section 115, authentication section 117, receiver-side confirmation processing section 118 and receiver-side control section 119. For example, the operational section 111 is a remote controller or control panel provided in the main body of the television receiver 110, and receives an operation from the user U. The operational section 111 is provided with a help button, and when the help button is pressed, the request generating section 112 generates request information in response to the pressing.

Based on a signal indicative of the help button being pressed, the request generating section 112 generates request information having the content for requesting the server 120 to generate key information. The method of generating a request signal is not limited to the method of using a help button, and any other methods are applicable such as selecting in a menu, accessing a specific website, or the like.

The receiver-side storing section 113 beforehand stores a receiver ID to identify the television receiver 110. The receiver-side transmitting/receiving section 114 is an interface to the network, and transmits and receives information to/from the outside. The receiver-side transmitting/receiving section 114 transmits the request information to the server 120, and receives the key information generated by the server 120. Further, when temporary connection is made, the section 114 receives the connection confirmation information from the server 120.

The notifying section 115 is a display screen, for example, and notifies the user U of the received key information or connection confirmation information. When notifying the key information, the notifying section 115 displays "Reception Number 1234" or the like as the key information on the display screen as shown in FIG. 1. Meanwhile, when notifying the connection confirmation information, the notifying section 115 displays the connection confirmation information such as a name of the operator OP or the like as shown in FIG. 2. In addition, the notifying section 115 is not limited to a display screen, and may be a speaker when the key information and connection confirmation information is output by voice. In other words, the form is not limited particularly when the section has the function capable of notifying the key information or connection confirmation information.

The authentication section 117 authenticates access from the external terminal 150 when the server succeeds in matching the key information from the external terminal 150. By authenticating the access, temporary connection is established. The receiver-side confirmation processing section 118 generates confirmation finish information indicating whether the connection is valid or not when receiving a predetermined operation, and performs the processing of transmitting the information to the server 120. The receive-side control section 119 controls each section based on the operation from the external terminal 150 when the access from the external terminal 150 is authenticated and real connection is established. At this point, the television receiver 110 is operated based on the operational information received from the external terminal 150. As a form of the operation, the television receiver 110 may be beforehand installed with a program for remote control so as to enable the external terminal 150 to access the server 120 to operate by GUI on the browser.

The server 120 has a server-side transmitting/receiving section 121, key information generating section 122, checking section 123, key information storing section 124, temporary connection establishing section 125, temporary connection information storing section 126, operator ID storing section 127, real connection establishing section 128, real connection information storing section 129, and server-side control section 129a. The server-side transmitting/receiving section 121 is an interface to the network, and transmits and receives information to/from the outside. The server-side transmitting/receiving section 121 receives the request information from the television receiver 110, and sends the key information. Further, the server-side transmitting/receiving section 121 receives the key information separately from the external terminal 150. The server-side transmitting/receiving section 121 transmits the key information to the television receiver 110, and receives the confirmation finish information from the external terminal 150.

The key information generating section 122 generates the key information when the server 120 receives request information. In addition, the key information may be 4-digit alphanumeric characters, for example, image signal, barcode or information output as sound. These kinds of information are particularly coded, and excellent in security. Further, as well as these kinds of information, considered as the key information are an image, characters, color bar, picture, speech signal and the like. The key information storing section 124 associates the generated key information with a receiver ID (receiver identification information) of the television receiver 110 that transmits the request information to store as a table. The receiver ID is information such as a MAC address, IP address, serial number or the like specific to the device enabling the device to be identified.

The checking section 123 checks the key information separately received from the external terminal 150 against the key information stored in the table, and determines whether the same key information exists or not. When determining that the same key information exists, the section 123 refers to the table, and reads a receiver ID corresponding to the key information received from the external terminal 150. The read receiver ID is used to identify the television receiver 110. Then, using the read receiver ID, the checking section 123 enables the external terminal 150 to access the television receiver 110 corresponding to the receiver ID and operate the television receiver 110. More specifically, the checking section 123 mediates to establish temporary connection between the external terminal 150 and the television receiver 110. When the temporary connection is established, it is considered that communications between the external terminal 150 and the television receiver 110 are performed by a method that the server 120 relays communications therebetween, a method that the server 120 informs the terminal 150 and receiver 110 of their identification information so as to perform communications in peer-to-peer, and the like. Such a method is allowed by the server 120 holding a table associating the identification information (MAC address, IP address) of the terminal 150 and receiver 110 with each other.

After the key information is generated, the key information storing section 124 associates the request information with the receiver ID of the television receiver 110 transmitting the request information to store the key information. When the key information is received from the external terminal 150, the temporary connection establishing section 125 associates the received key information with an operator ID specified from the key information as temporary connection information to store in the temporary connection information storing section 126 together with a temporary connection ID as the temporary connection information.

The temporary connection information storing section 126 associates the received key information with the operator ID as the temporary connection information to store as the temporary connection information together with the temporary connection ID. The operator ID storing section 127 stores the operator ID and an external terminal ID of the external terminal 150 beforehand received from the external terminal 150.

When confirmation finish information transmitted from the external terminal is received, the real connection establishing section 128 determines whether the connection is valid by the confirmation finish information, and when the connection is valid, switches the temporary connection to real connection to establish the real connection. More specifically, the real connection establishing section 128 stores real connection information associated with each of the key information and operator ID in the real connection information storing section 129. The real connection information storing section 129 stores the key information and operator ID stored as the temporary connection information, as real connection information, when the temporary connection is switched to the real connection. The server-side control section 129*a* controls each section of the server 120.

The conveyance means T is comprised of the user-side conveyance device 130 and operator-side conveyance device 140. For example, the user-side conveyance device 130 is a device such as a cellular telephone or the like, and enables the key information to convey to the operator OP. The operator-side conveyance device 140 is a fixed-line telephone or the like, for example, and enables conveyance of the key information to be received. By these means, the user U is capable of verbally conveying the key information to the operator OP, and the user and operator are able to communicate with each other for consultation on setting and the like. As the conveyance means T, as well as the above-mentioned example, usable are a video telephone, personal computer and cellular telephone having the e-mail function, and a camera or cellular telephone with a camera to display a barcode, and two-dimensional barcode, color bar.

The external terminal 150 is a personal computer (PC) or the like, and is able to access the server 120 via the network. The external terminal 150 has an operational section 151, display section 152, external terminal-side storing section 153, external terminal-side transmitting/receiving section 154, external terminal-side confirmation processing section 155, and external terminal-side control section 156. The operational section 151 is an input device such as, for example, a keyboard, mouse and the like, and receives operations of the operator OP. The operational section 151 receives an input when the operator OP inputs the key information. For example, a display screen corresponds to the display section 152, and displays information such as the key information and the like input by the operator OP. The operator OP is able to confirm that the key information input by the operator is not wrong. The external terminal-side storing section 153 beforehand stores the external terminal ID to identify the external terminal 150, and stores the operator ID when the operator OP uses the external terminal 150.

The external terminal-side transmitting/receiving section 154 is an interface to the network, and transmits and receives the information to/from the outside. The external terminal-side transmitting/receiving section 154 transmits the external terminal ID and operator ID to the server 120 in log-in. Further, when the user makes a request, the section 154 transmits the key information input by the operator OP. Meanwhile, the section 154 transmits the confirmation finish information to the server 120 when the operator ID is confirmed. Moreover, the section 154 is used when the external terminal 150 accesses the television receiver 110. The external terminal side confirmation processing section 155 performs processing for generating the confirmation finish information including information indicating whether the connection is valid or not when receiving a predetermined operation, and transmitting the information to the server 120. The external terminal-side control section 156 controls each section of the external terminal 150. In addition, the external terminal 150 includes outside terminals having no relationship with the television receiver 110 in advance.

(Operation of the Operational System)

Figure 4:
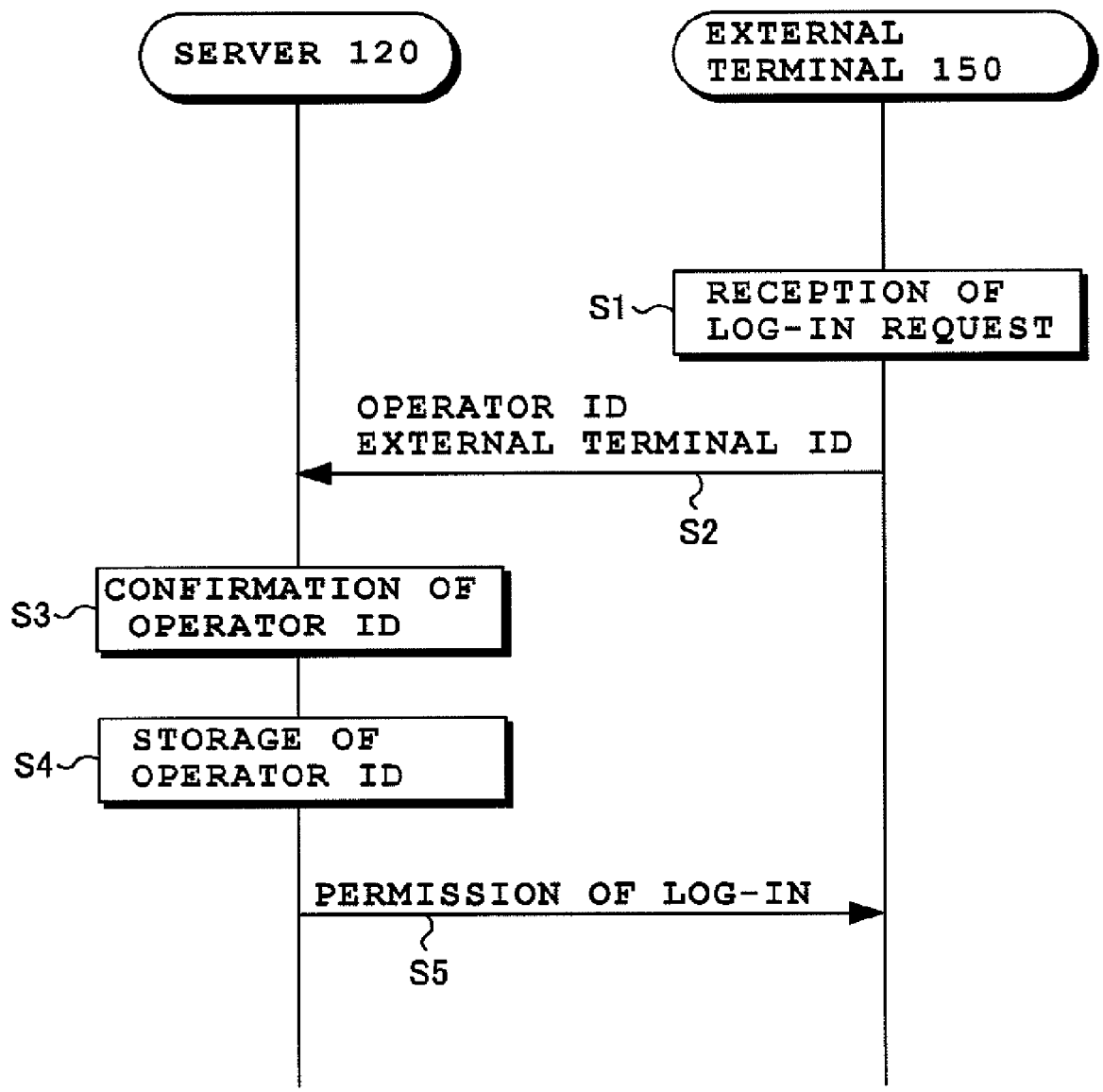
FIG. 4 is a sequence chart showing an example of the operation in the television receiver operational system according to Embodiment 1.
Figure 5:
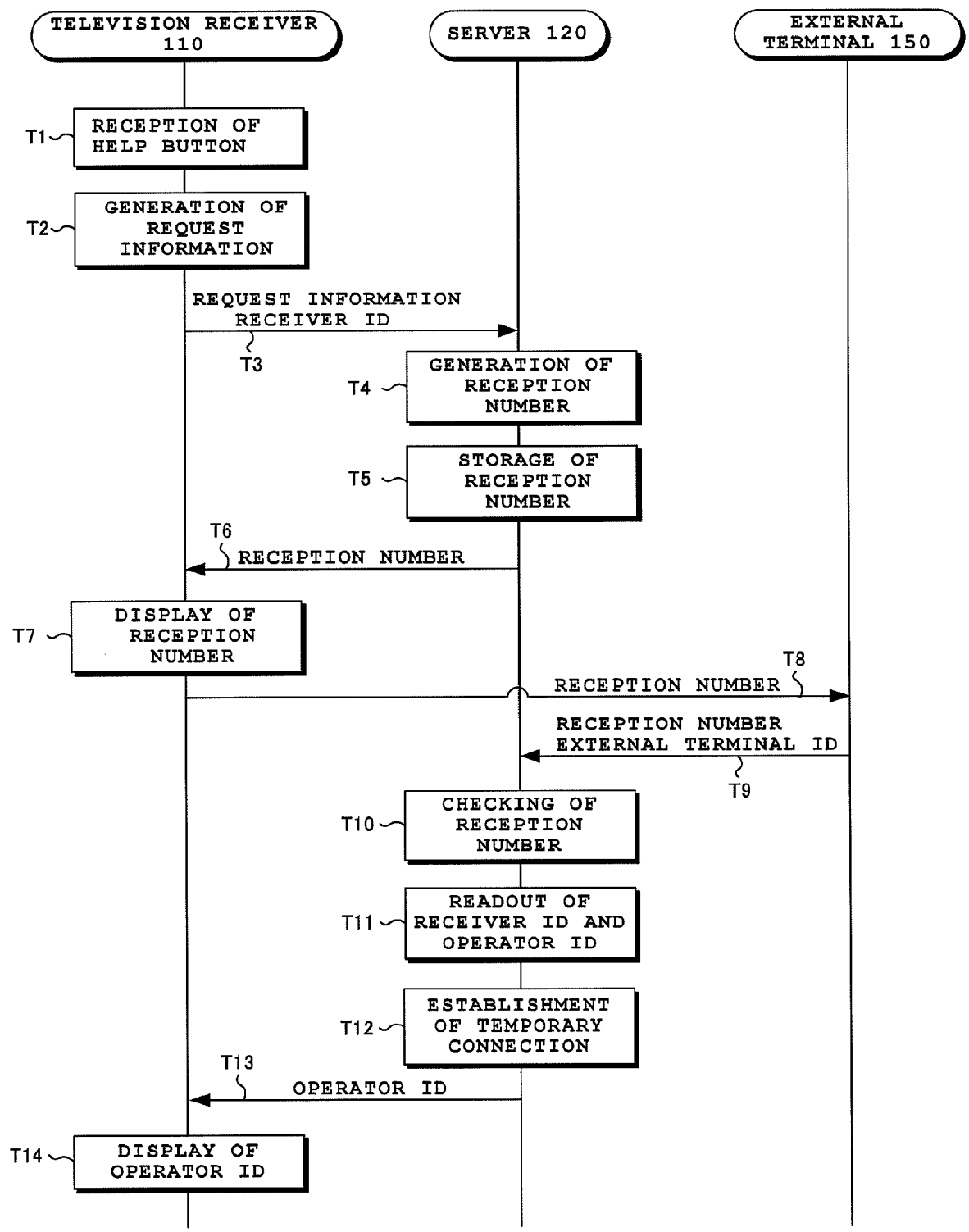
FIG. 5 is another sequence chart showing an example of the operation in the television receiver operational system according to Embodiment 1.
Figure 6:
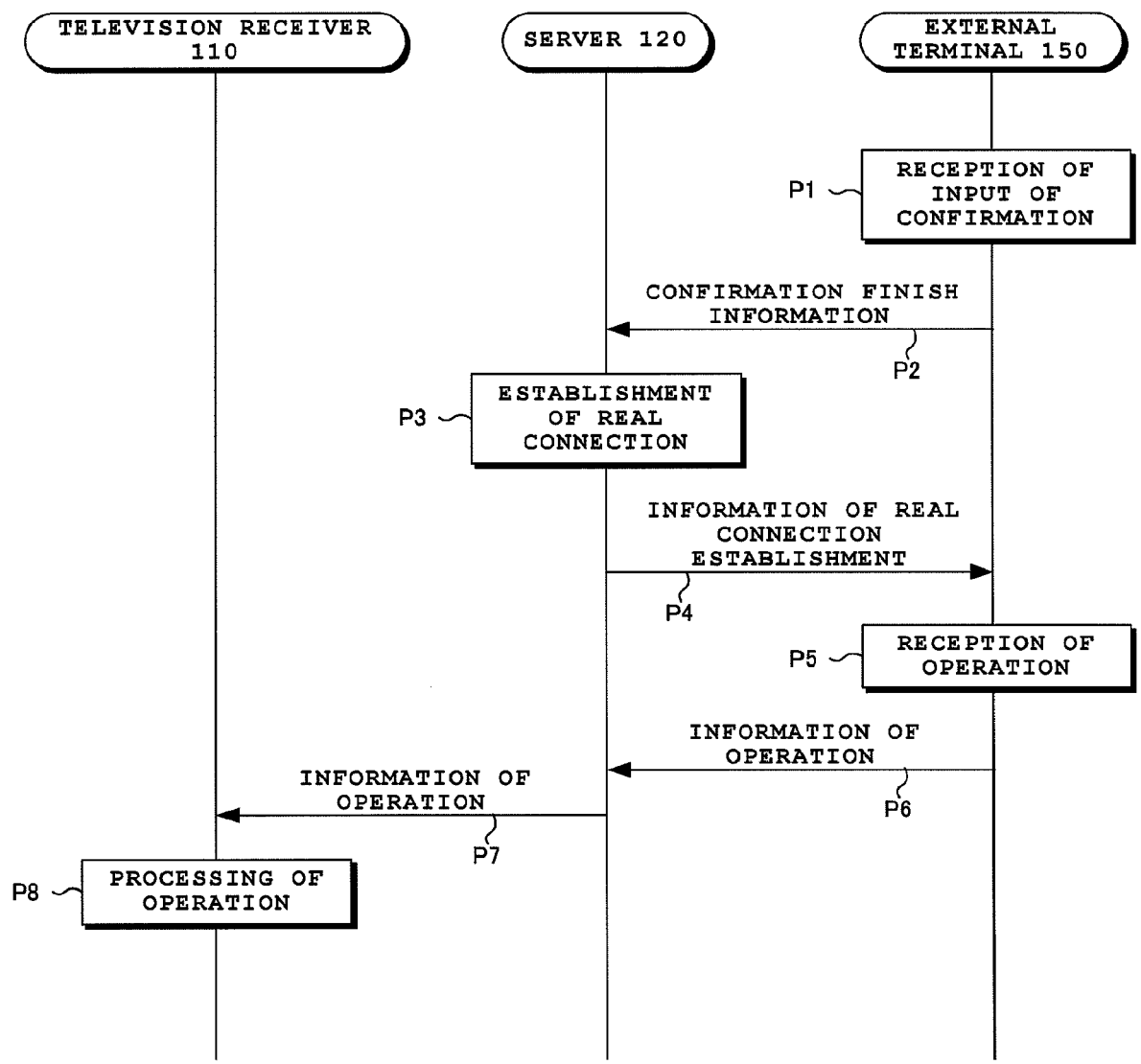
FIG. 6 is still another sequence chart showing an example of the operation in the television receiver operational system according to Embodiment 1.

Described next is the operation of thud configured television receiver operational system 100. FIGS. 4 to 6 are sequence charts showing an example of the operation in the television receiver operational system 100. First, as shown in FIG. 4, an operator OP logs in using an external terminal 150 assigned to the operator OP. Log-in is performed, for example, in starting business operations. When the operator OP performs the log-in operation (step S1), the external terminal 150 transmits an operator ID and external terminal ID to the server 120 (step S2). The server 120 checks the operator ID (step S3), and associates the operator ID with the external terminal ID to store in the operator ID storing section 127 as an operator table (step S4). Then, the server 120 transmits permission information of log-in to the external terminal 150 (step S5). Thus, the log-in processing of the external terminal 150 is finished.

For example, a situation is assumed that a user makes an inquiry with the external terminal 150 thus logged in. The user U purchased the television receiver 110, has connected to the Internet, however, is not proceeding with the setting successfully, and calls the operator OP. The user is instructed to "press a help button to enable the operator to make the setting" by telephone from the operator OP.

In such a situation, as shown in FIG. 5, the television receiver 110 receives pressing of the help button by the user (step T1). By the help button being pressed, the television receiver 110 generates request information (step T2). Then, the television receiver 110 transmits the request information and a receiver ID of the television receiver 110 to the server 120 (step T3).

Upon receiving the request information, the server 120 generates a reception number (key information) (step T4). For example, 4-digit alphanumeric characters can be used as the reception number. Then, the server 120 associates the reception number with the receiver ID as a table to store in the key information storing section 124 (step T5). Then, concurrently with storage, the server 120 transmits the generated reception number to the television receiver 110 (step T6).

The television receiver 110 displays the reception number received from the server 120 in the display screen 115 (notifying section) to notify the user U (step T7). The user U informs the operator OP of the displayed number by telephone (conveyance means T), and the operator OP inputs the informed number in the external terminal 150 (step T8). The external terminal 150 with the reception number input thereto transmits the reception number to the server 120 (step T9).

The server 120 checks the received reception number against the stored reception number of the table (step T10). As a result of checking, when the same reception number is found, the server 120 reads the receiver ID and operator ID associated with the reception number (step T11. Then, the server 120 performs processing for establishing temporary connection between the television receiver 110 identified by the read identification information and the external terminal 150 transmitting the reception number (step T12).

In addition, considered as the method of establishing temporary method is a method of creating a state in which the server 120 accesses the television receiver 110, and instructions of the external terminal 150 are transmitted to the television receiver 110 via the server 120, but the invention is not limited thereto. In other words, it is enough that the television receiver 110 and external terminal 150 are capable of exchanging data, and the server 120 may transfer the data. Alternately, the server may transmit an IP address to the external terminal 150 to enable direct exchange of data.

Then, when the temporary connection is established, the server 120 extracts the operator ID from the operator ID storing section 127, and the receiver ID from the key information storing section 124, and transmits the operator ID to the television receiver 110 corresponding to the receiver ID as connection confirmation information (step T13). The television receiver 110 receiving the operator ID displays the operator ID (step T14).

Thus, the operator ID is notified to the user U. Next, as shown in FIG. 6, the user U confirms it with the operator that the notified operator ID indicates the operator OP, and the operator OP inputs the confirmation in the external terminal 150 (step P1). Upon receiving the input of the operator OP, the external terminal 150 generates confirmation finish information to transmit to the server 120 (step P2). Upon receiving the confirmation finish information, the server 120 determines whether or not the operator ID is of the operator inquiring by the confirmation finish information i.e. whether the connection is valid. Then, when the connection is valid, the server 120 switches the temporary connection to real connection, and establishes the real connection (step P3). In addition, the specific real connection establishment processing will be described below. When the connection is established, the server 120 transmits the information of the real connection establishment to the external terminal 150 (step P4).

Thus, with the connection established, the external terminal 150 is allowed to operate the television receiver 110. At this point, upon receiving the operation of the operator OP (step P5), the external terminal 150 transmits information of the operation to the server 120. The server 120 receives the operation information from the external terminal 150 (step P6) to transmit to the television receiver 110 (step P7). Then, the television receiver 110 performs the processing in accordance with the operation of the operator OP (step P8). Thus, the operator OP is capable of operating the television receiver 110 using the external terminal 150, and for example, making the initial setting of the television receiver 110. In addition, in the aforementioned example, the operational system of the invention is applied to the case of making the initial setting of the television receiver 110, but may be applied to the case of making the channel setting specific to a region when the user moves to the region.

(Operation of the Server)

Figure 7:
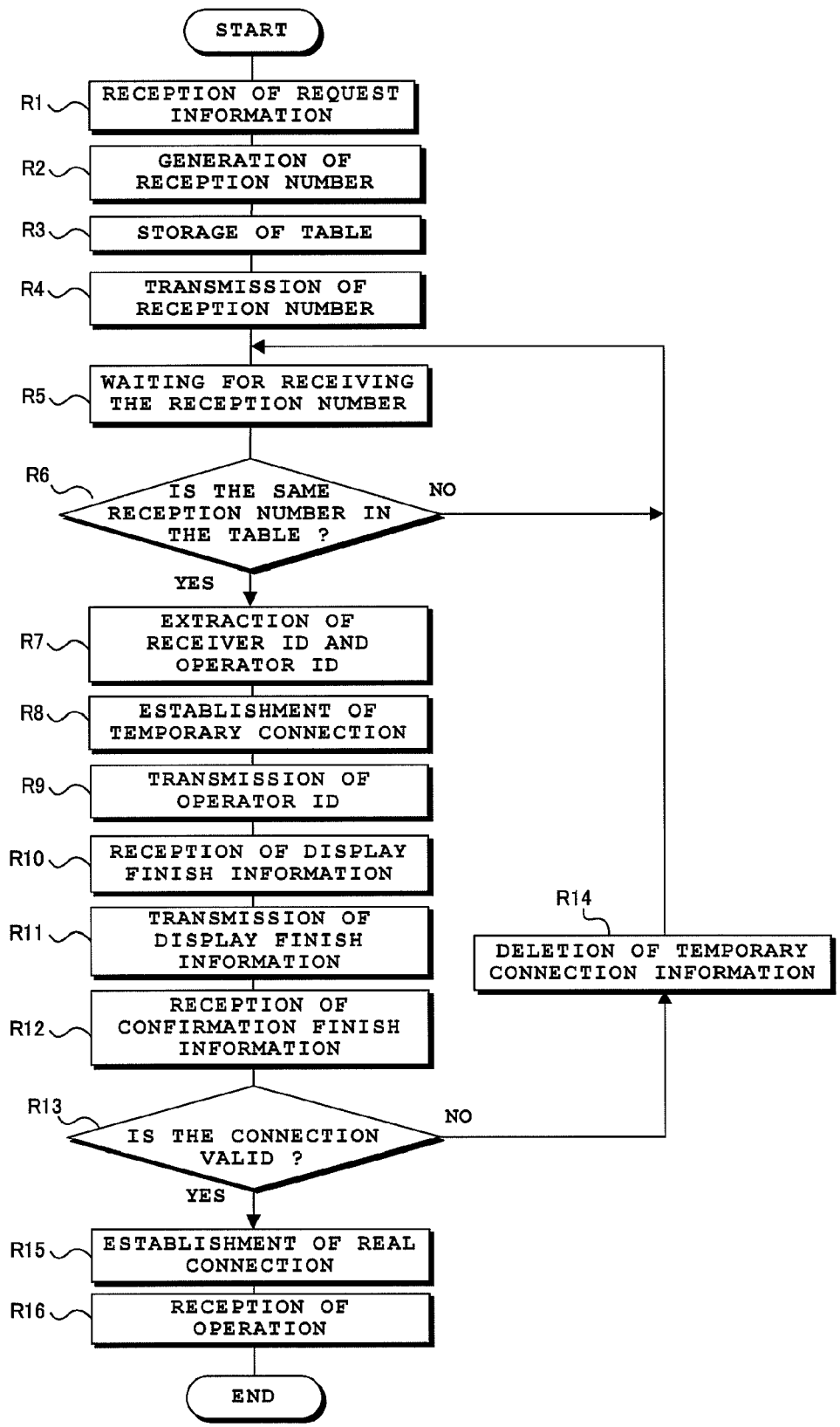
FIG. 7 is a flowchart illustrating the operation of a server according to Embodiment 1.

Among the aforementioned operations, in particular, the operation of the server 120 will specifically be described below. FIG. 7 is a flowchart illustrating the operation of the server 120. First, the server 120 receives request information and receiver ID from the television receiver 110 (step R1). Then, upon receiving the request information, the server 120 generates a reception number (step R2). The server 120 associates the reception number with the receiver ID to store in a table (step R3). Next, the server 120 transmits the generated reception number to the television receiver 110 (step R4).

After transmitting the reception number, the server 120 waits for reception of the reception number (step R5), and when receiving the reception number from the external terminal 150, proceeds to step R6. Then, the server 120 determines whether the stored table has the same reception number as the received reception number (step R6).

When the same reception number does not exist, the server 120 displays an error message, while returning to step R5. In this case, the processing is performed again from the beginning, or the notified reception number is conveyed again. When the same number exists, the server 120 extracts the receiver ID associated with the reception number (step R7).

Then, the server 120 establishes the temporary connection between the external terminal 150 transmitting the reception number and the television receiver 110 identified by the receiver ID (step R8). When the temporary connection is established, the server 120 transmits the operator ID to the television receiver 110 as the connection confirmation information (step R9). Next, the server 120 receives display finish information indicating that the operator ID is displayed in the display screen 115 of the television receiver 110 from the television receiver 110 (step R10) to transmit to the external terminal 150 (step R11). The external terminal 150 is thus capable of displaying the received display finish information. The operator OP looks at the display finish information, and is able to know that the information to confirm the temporary connection involving the operator is currently being displayed in the television receiver 110.

Next, the user U watching the television receiver 110 makes a conversion with the operator OP by telephone or the like, and the operator OP confirms that the operator ID is of the operator calling. The external terminal 150 accepting the input of the operator OP transmits the confirmation finish information to the server 120. The server 120 receives the confirmation finish information (step R12). The server 120 determines whether or not the connection is valid by the received confirmation finish information (step R13), and when determining that the connection is not valid, deletes the temporary connection information (step R14) to return to step R5. When determining that the connection is valid by the confirmation finish information, the server 120 switches the temporary connection to the real connection to establish the real connection (step R15). Then, the server 120 receives the operation information from the external terminal 150 (step R16). In addition, when it is determined that the connection is not valid, the server 120 preferably displays an error message in at least one of the television receiver 110 and the external terminal 150.

(Table Example of Key Information)

As described above, when the external terminal 150 operates the television receiver 110, the table is required for the checking processing in the server 120. The table has the reception number and the receiver ID associated by the server 120 and is stored in the key information storing section 124. FIG. 8 is a diagram showing an example of the table. As shown in FIG. 8, the reception number is comprised of 4-digit alpha numeric characters. Each reception number is associated with a MAC address (receiver ID) of the television receiver and stored in the key information storing section 124 of the server 120.

For example, in the example as shown in FIG. 8, MAC address of 00:11:22:33:44:55 is stored for reception number 1111. In this case, the server 120 generates reception number 1111 based on the request information of the television receiver 110 identified by the MAC address of 00:11:22:33:44:55 to store in the table. Then, reception number 1111 has been transmitted to the television receiver 110 identified by the MAC address of 00:11:22:33:44:55. When the server 120 receives reception number 1111 from the external terminal 150, temporary connection is established between the television receiver 110 identified by the MAC address of 00:11:22:33:44:55 and the external terminal 150 transmitting reception number 1111 after the checking processing. Herein, as the information to identify the television receiver 110, the MAC address is described as an example. The identification information may be information such as a serial number or the like specific to the apparatus, IP address, or a combination thereof.

(Display Example of Key Information)

In the aforementioned example, the television receiver 110 displays 4-digit alphanumeric characters as the key information without change to notify the user, but a barcode may be used. FIGS. 9A and 9B are views showing aspects of the television receiver 110 notifying a reception number using a barcode. A barcode having a combination of lines with difference widths may be used as shown in FIG. 9A, or a two-dimensional barcode may be used as shown in FIG. 9B.

(Table Example of Operator ID)

The operator ID is stored in the operator ID storing section 127 of the server 120 as a table when the operator OP logs in using the external terminal 150. FIG. 10 is a diagram showing an operator ID table stored in the operator ID storing section 127. As shown in FIG. 10, in the table are stored operator IDs such as operator numbers, names of operators and the like in association with external terminal IDs such as IP addresses and like of the external terminals 150. For example, in the example in the figure, operator number A0001 and Taro Yamada that is a name of the operator are associated with 192.168.10.100 that is an IP address of the external terminal 150.

(Table Example of Temporary Connection Information)

The temporary connection information is stored in the temporary information storing section 126 as a table when the external terminal 150 and television receiver 110 are temporarily connected. FIG. 11 is a diagram showing a table storing the temporary connection information. As shown in FIG. 11, in the table are associated the key information such as the reception number and the like, the operator ID such as the operator number and the like, and a reference number of temporary connection. For example, in the example of the figure, reception number 2222 is associated with operator number S007 and reference number T579.

(Display Example of Connection Confirmation Information)

Figure 12A:
FIGS. 12A to 12C are views showing aspects of a television receiver notifying an operator ID or temporary connection ID.
Figure 12B:
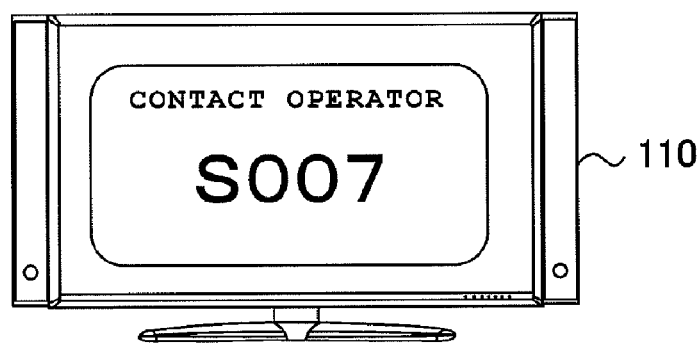
Figure 12C:
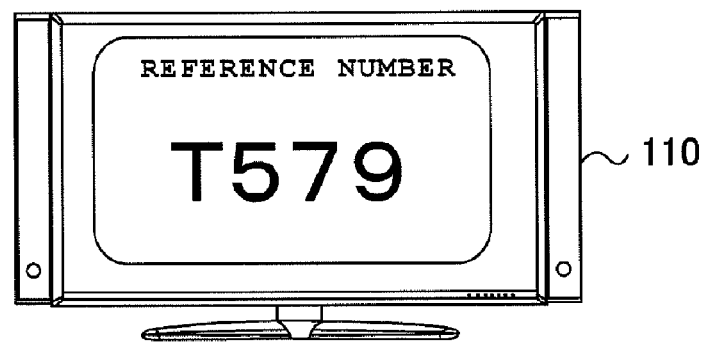

When the temporary connection is established, the server 120 transmits the operator ID to the television receiver 110 as the connection confirmation information. At this point, the television receiver 110 displays the operator ID in the display screen or the like. FIGS. 12A to 12C are display examples of the operator ID (connection confirmation information) displayed in the television receiver 110. For example, in the example as shown in FIG. 12A, the television receiver 110 displays a name of the contact operator. By this means, the user U is capable of informing the operator OP of the name of the operator OP by telephone or the like, and confirming whether the name is of the operator. Meanwhile, in the example as shown in FIG. 12B, the television receiver 110 displays the operator number of the operator OP. Further, in the example as shown in FIG. 12C, the television receiver 110 displays the reference number of the temporary connection. Thus, the information displayed in the television receiver 110 as the connection confirmation information may be information specific to the temporary connection.

(Table Example of Real Connection Information)

Figures 13, 14:
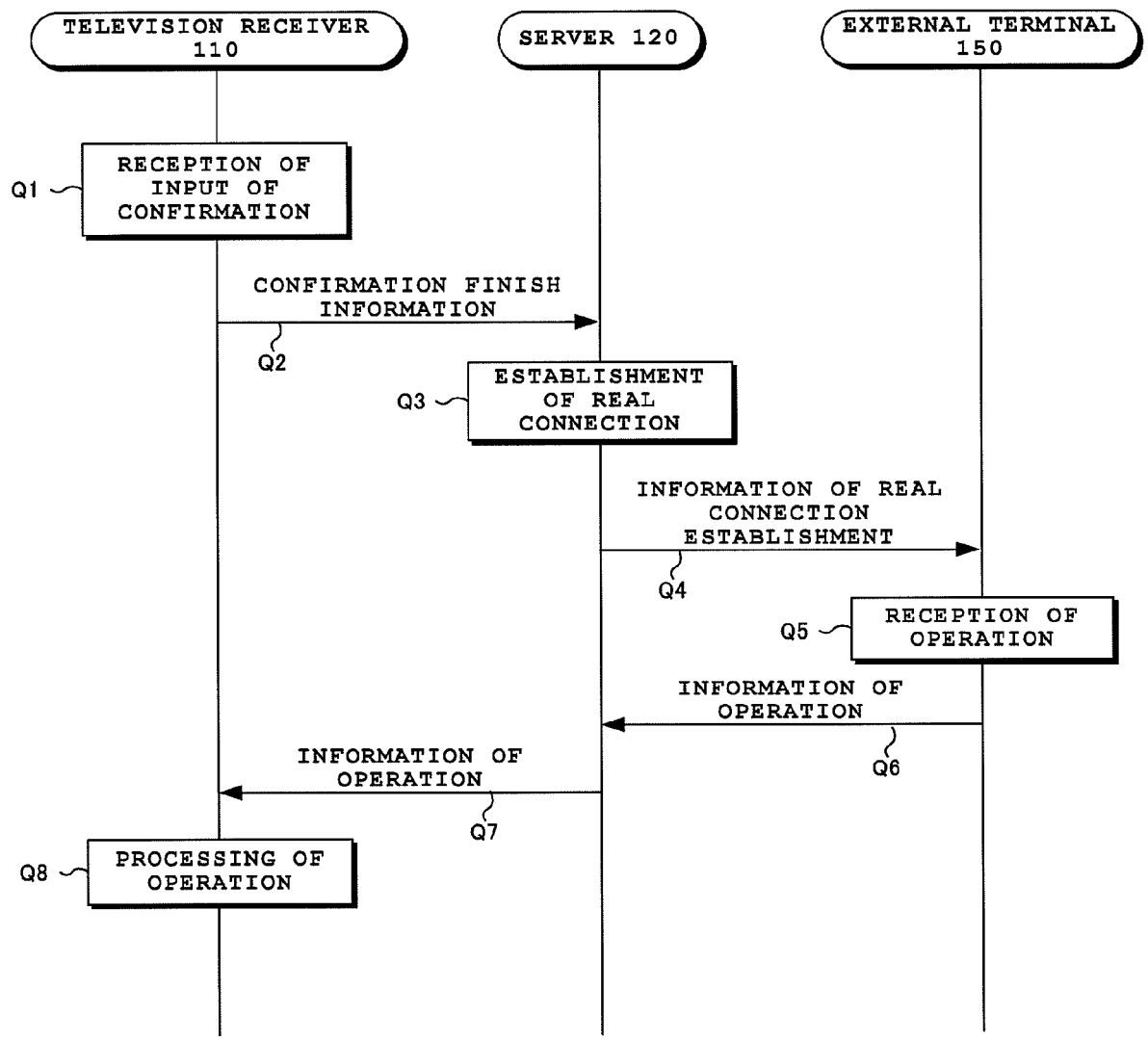
FIG. 13 is a diagram showing an example of a table of real connection information.
FIG. 14 is a sequence chart showing an example of the operation in a television receiver operational system according to Embodiment 2.

When the real connection establishing section 128 determines that the operator ID (connection confirmation information) is confirmed by the confirmation finish information, the real connection establishing section 128 switches the temporary connection to the real connection to establish the real connection. More specifically, the section 128 deletes the confirmed temporary connection information from the table of temporary connection information, and adds information of the confirmed connection to the table of real connection information. FIG. 13 is a diagram showing a table of real connection information. As shown in FIG. 13, in the table of real connection information are associated the key information such as the reception number and the like, and the operator ID such as the operator number and the like.

[Embodiment 2]

In the aforementioned Embodiment the external terminal 150 transmits the confirmation finish information, and the television receiver 100 side may transmit the confirmation finish information. FIG. 14 is a sequence chart illustrating the processing of each device when the television receiver 110 side transmits the confirmation finish information.

As shown in FIG. 14, the user U checks with the operator that the notified operator ID indicates the operator OP, and inputs the confirmation in the television receiver 110 (step Q1). Upon receiving the input of the user U, the television receiver 110 transmits the confirmation finish information to the sever 120 (step Q2). Upon receiving the confirmation finish information, the server 120 determines whether or not the operator ID is of the operator OP making an inquiry (valid) by the confirmation finish information, and when the operator ID is valid, switches the temporary information to real connection to establish the real connection (step Q3). When the connection is established, the server 120 transmits information indicative of the establishment of connection to the external terminal 150 (step Q4).

Thus, when the connection is established, the external terminal 150 is allowed to operate the television receiver 110. At this point, the external terminal 150 receives the operation of the operator OP (step Q5), and transmits information of the operation to the server 120. The server 120 receives the operation information from the external terminal 150 (step Q6) to transmit to the television receiver 110 (step Q7). Then, the television receiver 110 performs the processing in accordance with the operation of the operator OP (step Q8). Thus, the operator OP is capable of operating the television receiver 110 using the external terminal 150.

[Embodiment 3]

Figure 15:
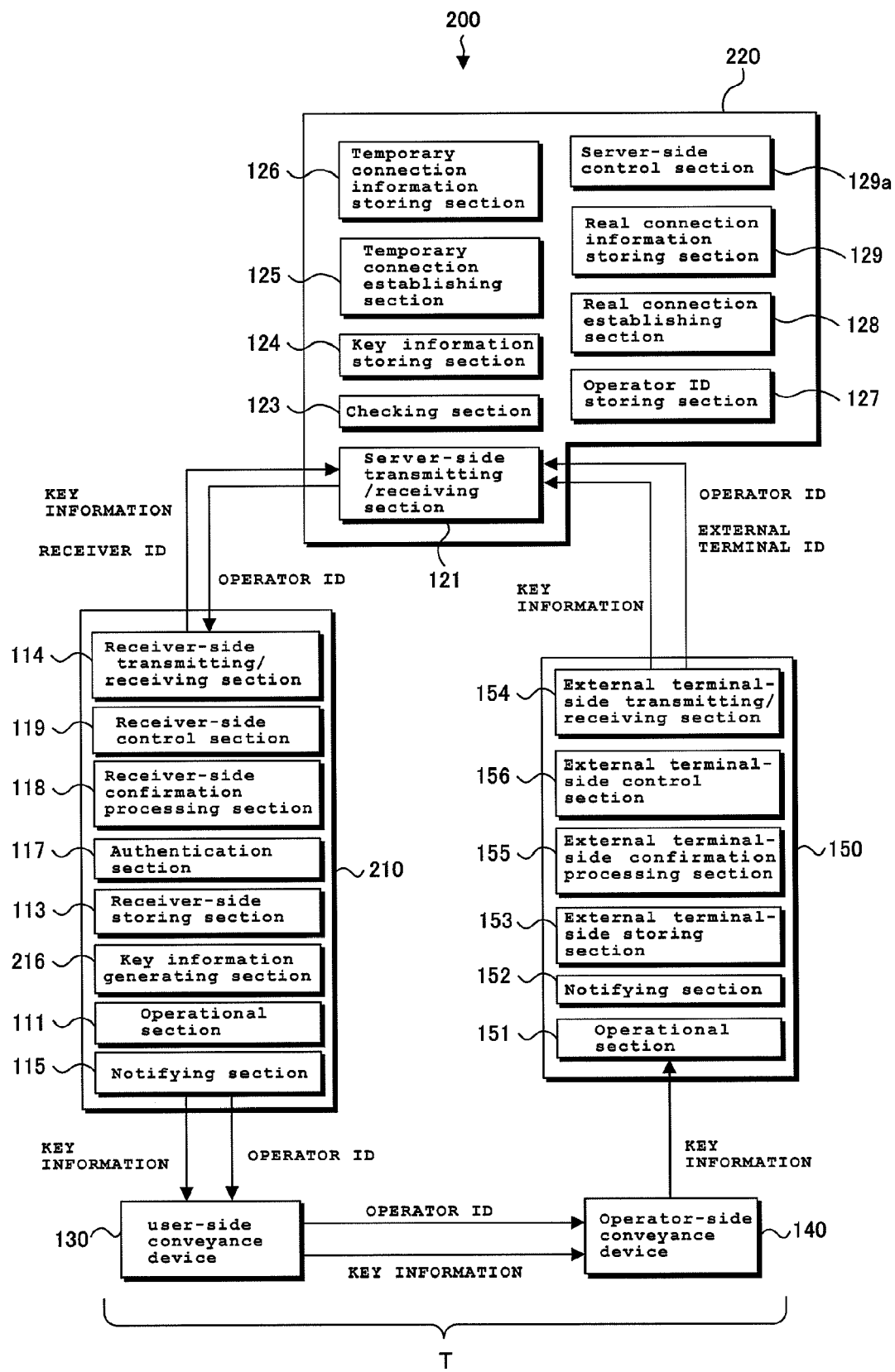
FIG. 15 is a block diagram illustrating a configuration of each section in a television receiver operational system according to Embodiment 3.

In the aforementioned embodiment the server 120 generates the key information, but the television receiver 110 may generate the key information. FIG. 15 is a block diagram illustrating a configuration of each section of a television receiver operational system 200. In this Embodiment, a television receiver 210 is provided with a key information generating section 216 as a substitute for the request generating section 112. The key information generating section 216 generates the key information, for example, in response to a predetermined operation such as pressing of the help button. Then, the receiver-side transmitting/receiving section 114 transmits the key information to a server 220. Meanwhile, the server 220 does not have the key information generating section 122. The other configuration is the same as in Embodiment 1. In addition, this Embodiment includes the case of using a number directly input by the user as the reception number.

Figure 16:
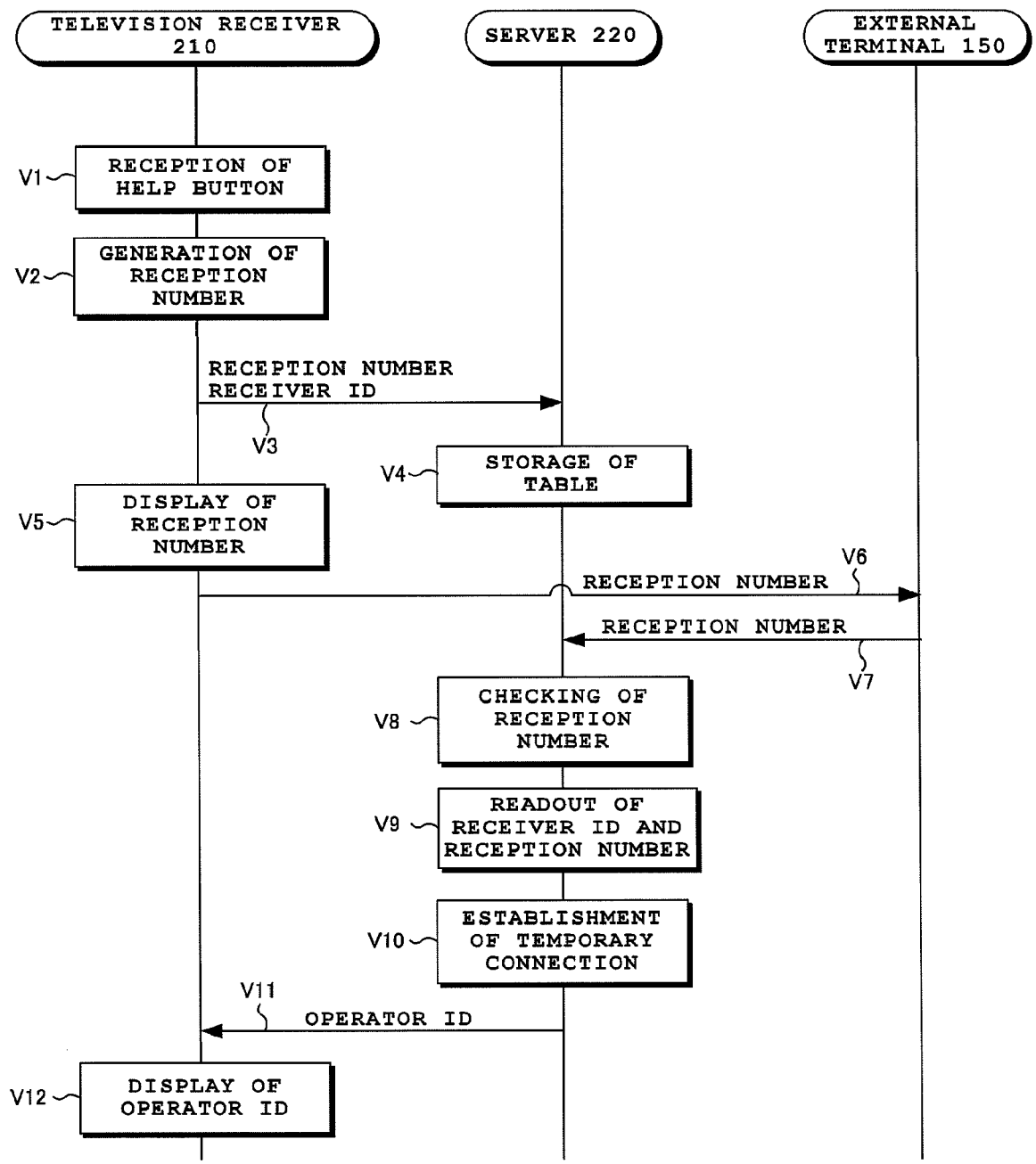
FIG. 16 is a sequence chart showing an example of the operation in the television receiver operational system according to Embodiment 3.

Described next is the operation of thus configured television receiver operational system 200. FIG. 16 is a sequence chart showing an example of the operation of the television receiver operational system 200. First, the television receiver 210 receives pressing of a help button by the user U (step V1). By the help button being pressed, the television receiver 210 generates a reception number (key information) (step V2). Then, the television receiver 210 transmits the reception number and a receiver ID of the television receiver 210 to the server 220 (step V3).

Upon receiving the reception number, the server 220 associates the reception number with the receiver ID as a table to store (step V4). Meanwhile, the television receiver 210 displays the generated reception number in the display screen 115 (notifying section) to notify the user U (step V5). The operation of subsequent steps V6 to V12 is performed in the same way as in steps T8 to T14 of Embodiment 1. Thus, the operator OP is allowed to operate the television receiver 210.

Figure 17:
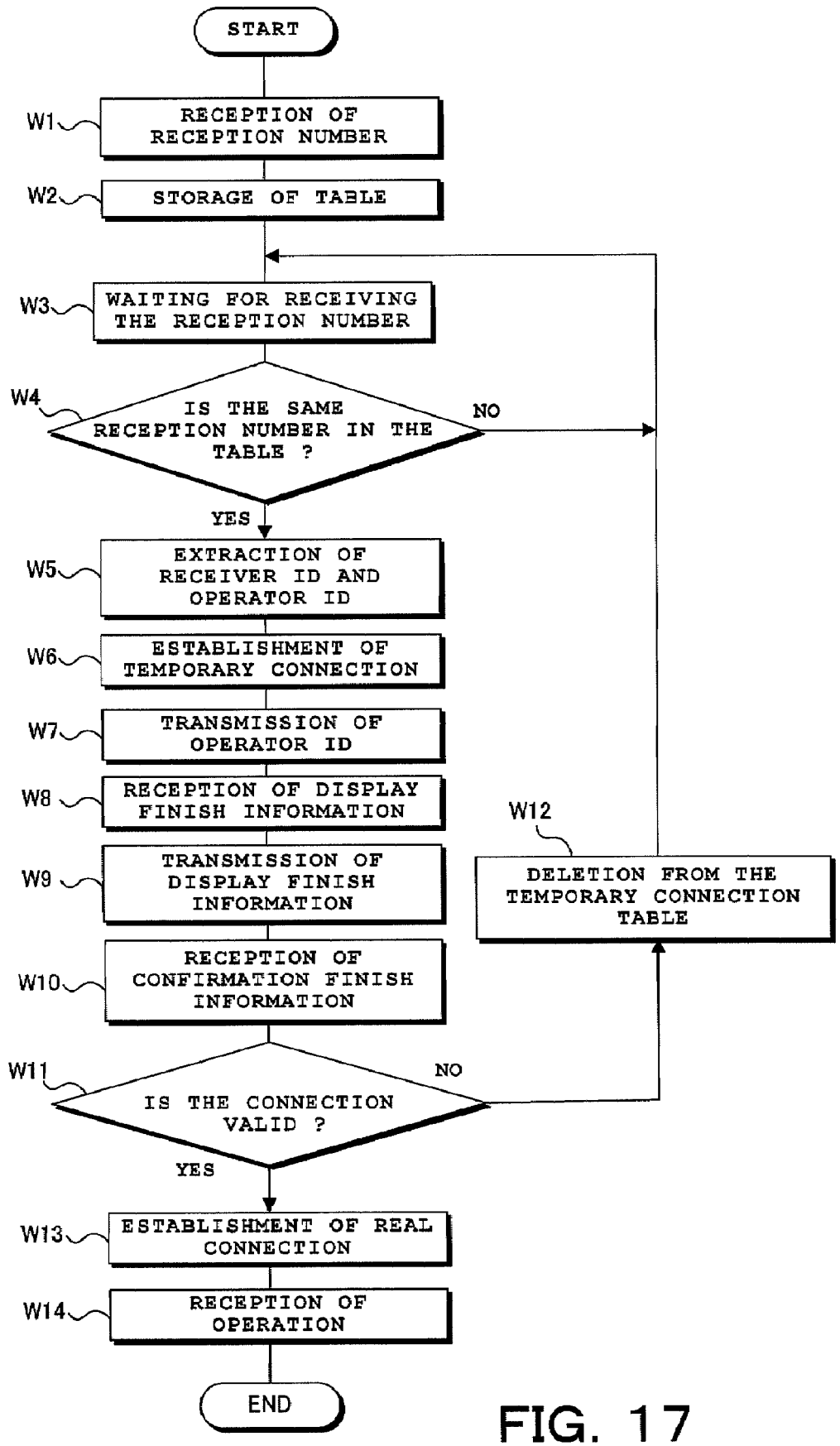
FIG. 17 is a flowchart illustrating the operation of a server according to Embodiment 3.

In this Embodiment, the operation differs from the operation in Embodiment 1 in that the server 220 does not generate the key information. FIG. 17 is a flowchart illustrating the operation of the server 220 in this Embodiment. The server 220 receives the reception number and receiver ID from the television receiver 210 (step W1), and associates the reception number with the receiver ID to store in the table (step W2). Then, the processing in steps W3 to W14 is performed in the same way as in the processing of steps R5 to R16 in Embodiment 1. Thus, it is also possible that the television receiver 210 generates the key information so as to actualize the operation from the external terminal 150.

[Embodiment 4]

In the above-mentioned Embodiments, the television receiver 110 notifies the user U of the reception number in response to the operation, and the reception number input to the external terminal 150 is checked against the previously generated reception number, but an external terminal 350 may notify the operator OP of the reception number in response to the operation so that the reception number input to a television receiver 310 is checked.

Figure 18:
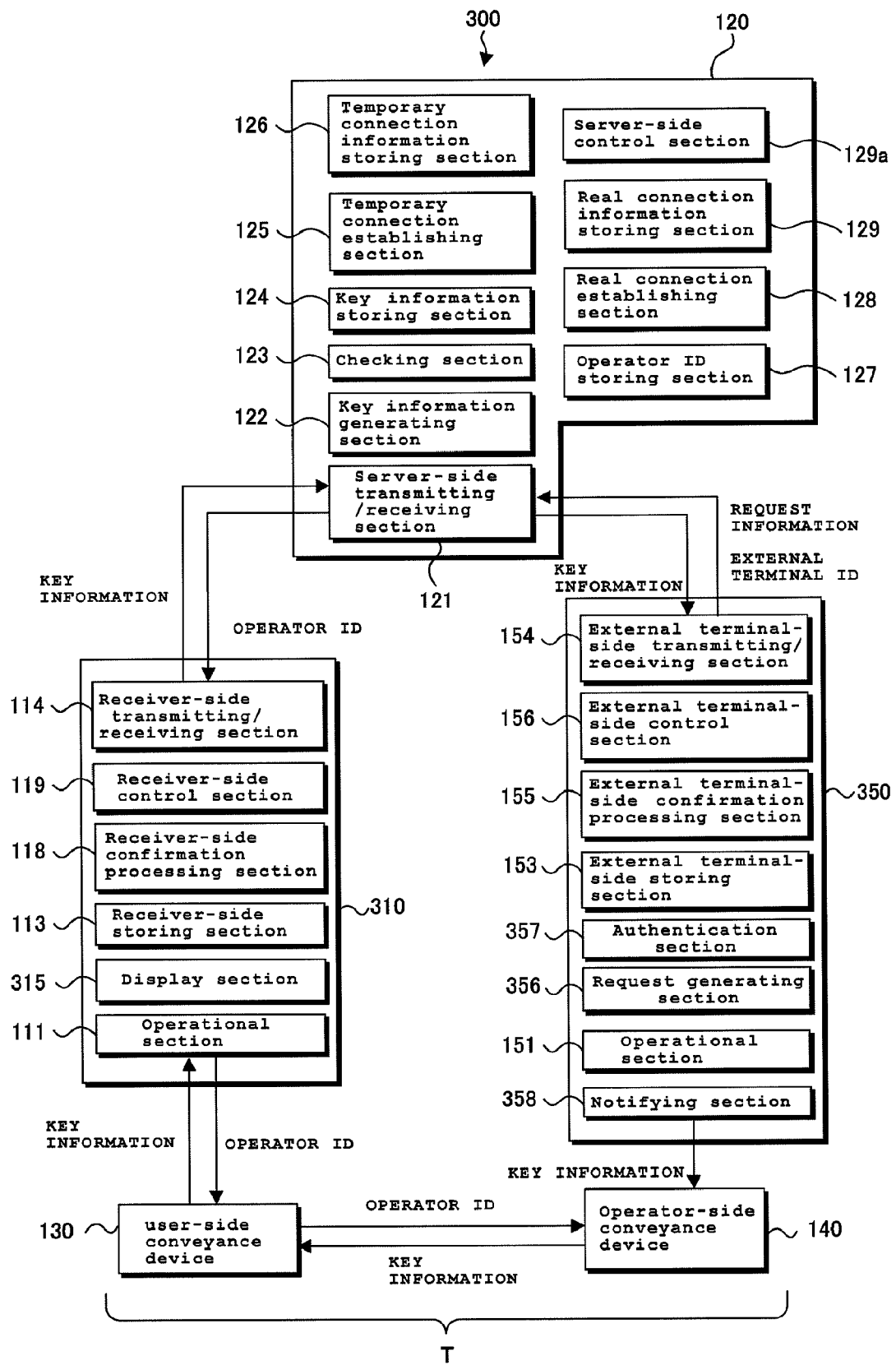
FIG. 18 is a block diagram illustrating a configuration of each section in a television receiver operational system according to Embodiment 4.

FIG. 18 is a block diagram illustrating a configuration of each section of a television receiver operational system 300. In this Embodiment, the television receiver 310 has neither the request generating section 112 nor the authentication section 117. Further, the television receiver 310 has a display section 315 as a substitute for the notifying section 115. Meanwhile, the external terminal 350 has a request generating section 356 and authentication section 357, and notifying section 356 as a substitute for the display section 152. The request generating section 356 generates request information for requesting the key information in response to a predetermined operation. The authentication section 357 performs authentication of access from the television receiver 310 when the server 120 succeeds in matching the key information transmitted from the television receiver 310.

Figure 19:
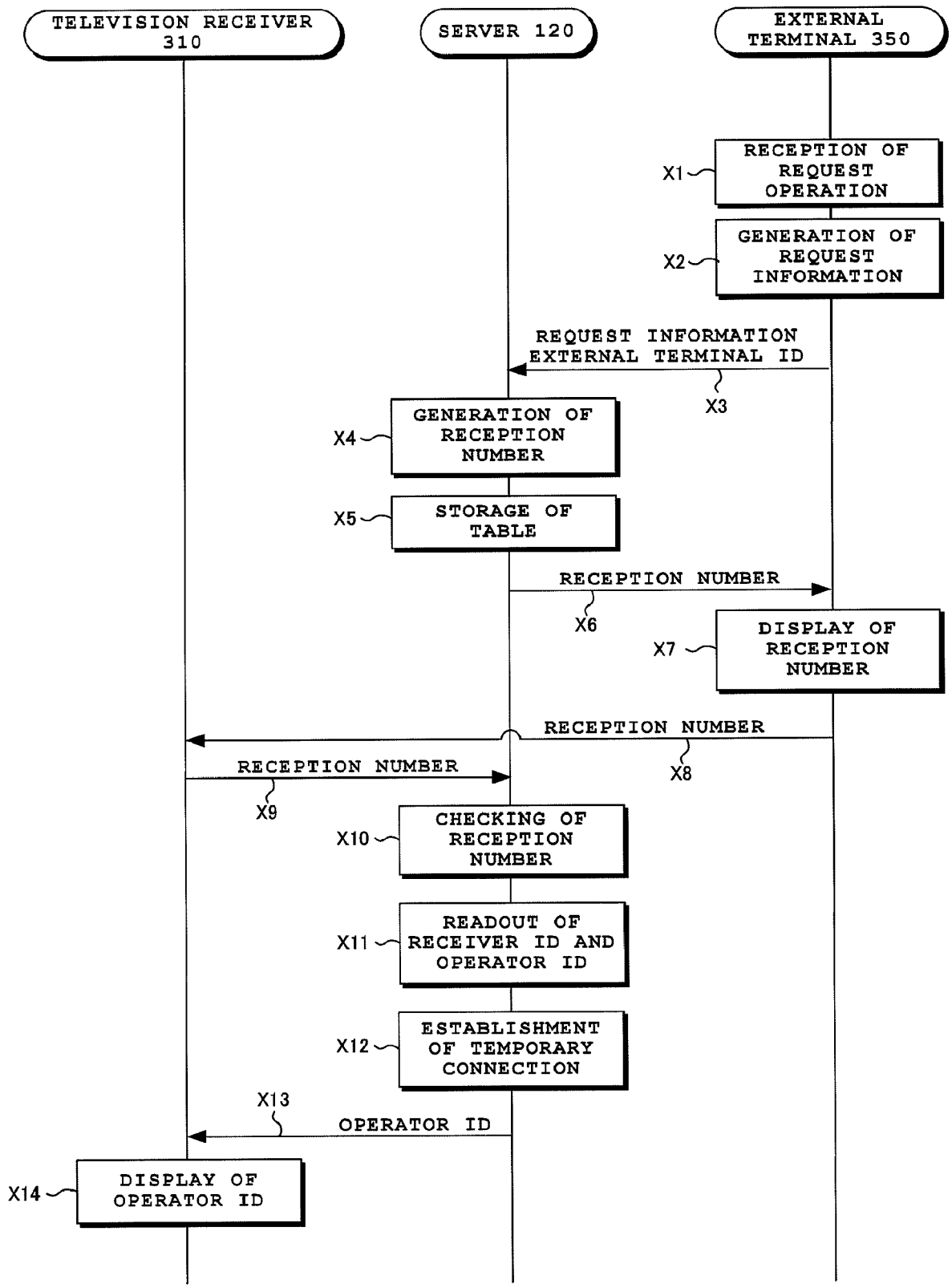
FIG. 19 is a sequence chart showing an example of the operation in the television receiver operational system according to Embodiment 4.

Described next is the operation of thus configured television receiver operational system 300. FIG. 19 is a sequence chart showing an example of the operation of the television receiver operational system 300. First, the external terminal 350 receives a request operation from the operator OP (step X1). The request operation is an operation to transmit request information such as clicking a predetermined button or the like to the server. By the request operation being accepted, the external terminal 350 generates the request information (step X2). Then, the external terminal 350 transmits the request information and external terminal identification information of the external terminal 350 to the server 120 (step X3). The external terminal identification information is information such as a MAC address, IP address, serial number and the like specific to the device enabling the device to be identified.

The server 120 generates a reception number (key information) by receiving the request information (step X4). Then, the server 120 associates the reception number with the external terminal identification information as a table to store (step X5). Concurrently with the storage, the server 120 transmits the generated reception number to the external terminal 350 (step X6).

The external terminal 350 displays the reception number received from the server 120 in a display screen 358 (notifying section) to notify the operator OP (step X7). The operator OP informs the user U of the displayed number by telephone (conveyance means T), and the user U inputs the informed number in the television receiver 310 (step X8). The television receiver 310 with the reception number input thereto transmits the reception number to the server 120 (step X9).

The server 120 checks the received reception number against the reception number beforehand stored in the table (step X10). As a result of checking, when the same reception number is found, the server 120 reads the receiver ID and operator ID associated with the reception number (step X11). Then, the server 120 performs processing for establishing temporary connection between the external terminal 350 identified by the read identification information and the television receiver 310 transmitting the reception number (step x12).

When the temporary connection is established, the server 120 transmits the operator ID to the television receiver 310 (step X13). The television receiver 310 receiving the operator ID displays the operator ID (step X14). Thus, the validity of the temporary connection is confirmed between the user U and operator OP. By this means, the television receiver 310 is remotely controlled by the external terminal 350, and the operator OP is capable of making the initial setting and the like of the television receiver 310.

[Embodiment 5]

Figure 20:
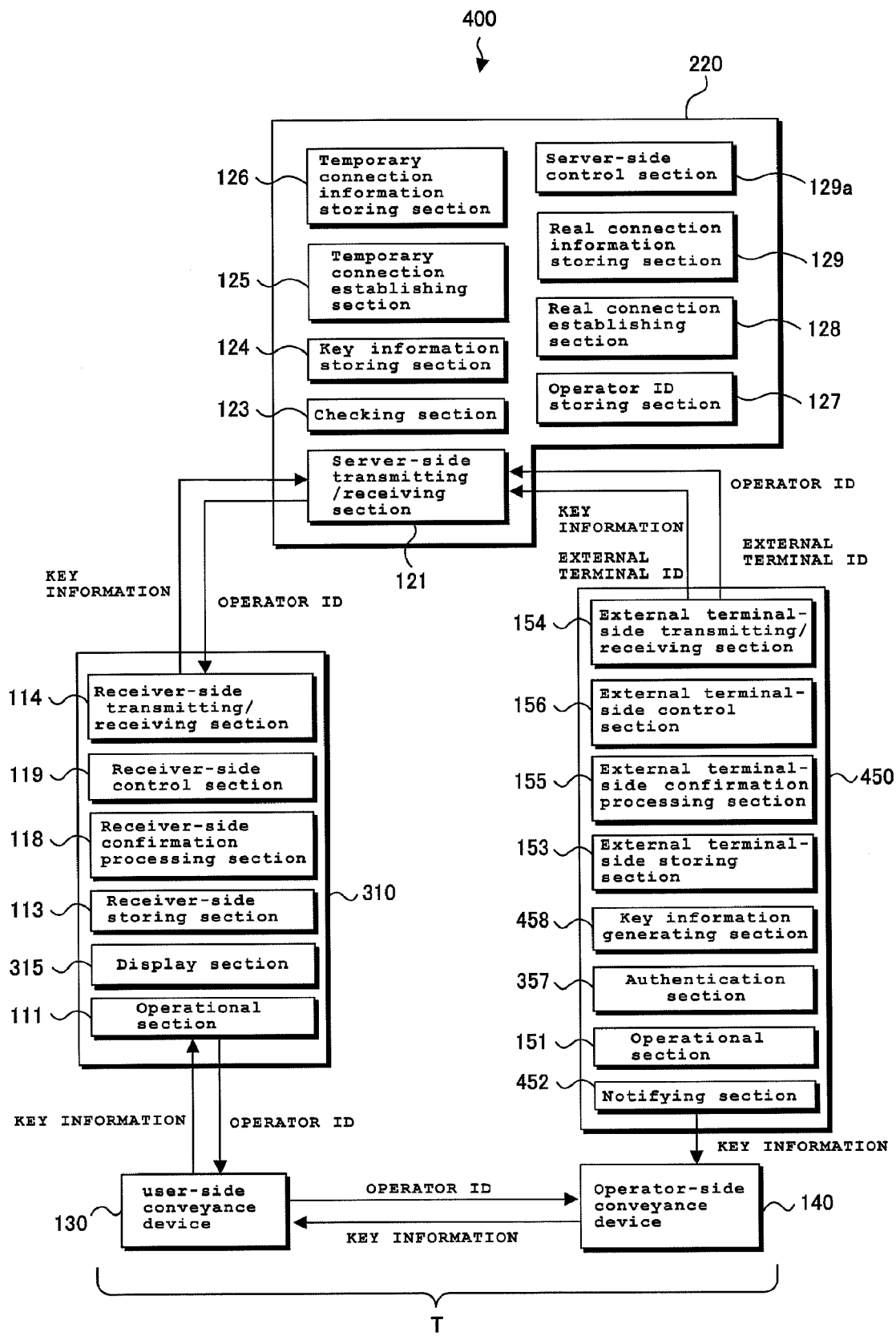
FIG. 20 is a block diagram illustrating a configuration of each section in a television receiver operational system according to Embodiment 5.

In the aforementioned embodiment the server 120 generates the key information, but an external terminal 450 may generate the key information. FIG. 20 is a block diagram illustrating a configuration of each section of a television receiver operational system 400. In this Embodiment, the external terminal 450 is provided with a key information generating section 458 as a substitute for the request generating section 356. The key information generating section 458 generates the key information, for example, in response to a predetermined operation such as pressing of a button for generating a reception number. Then, the external terminal-side transmitting/receiving section 154 transmits the key information to the server 220. A notifying section 452 is a display screen (display section), for example, and notifies the operator OP of the received key information.

Figure 21:
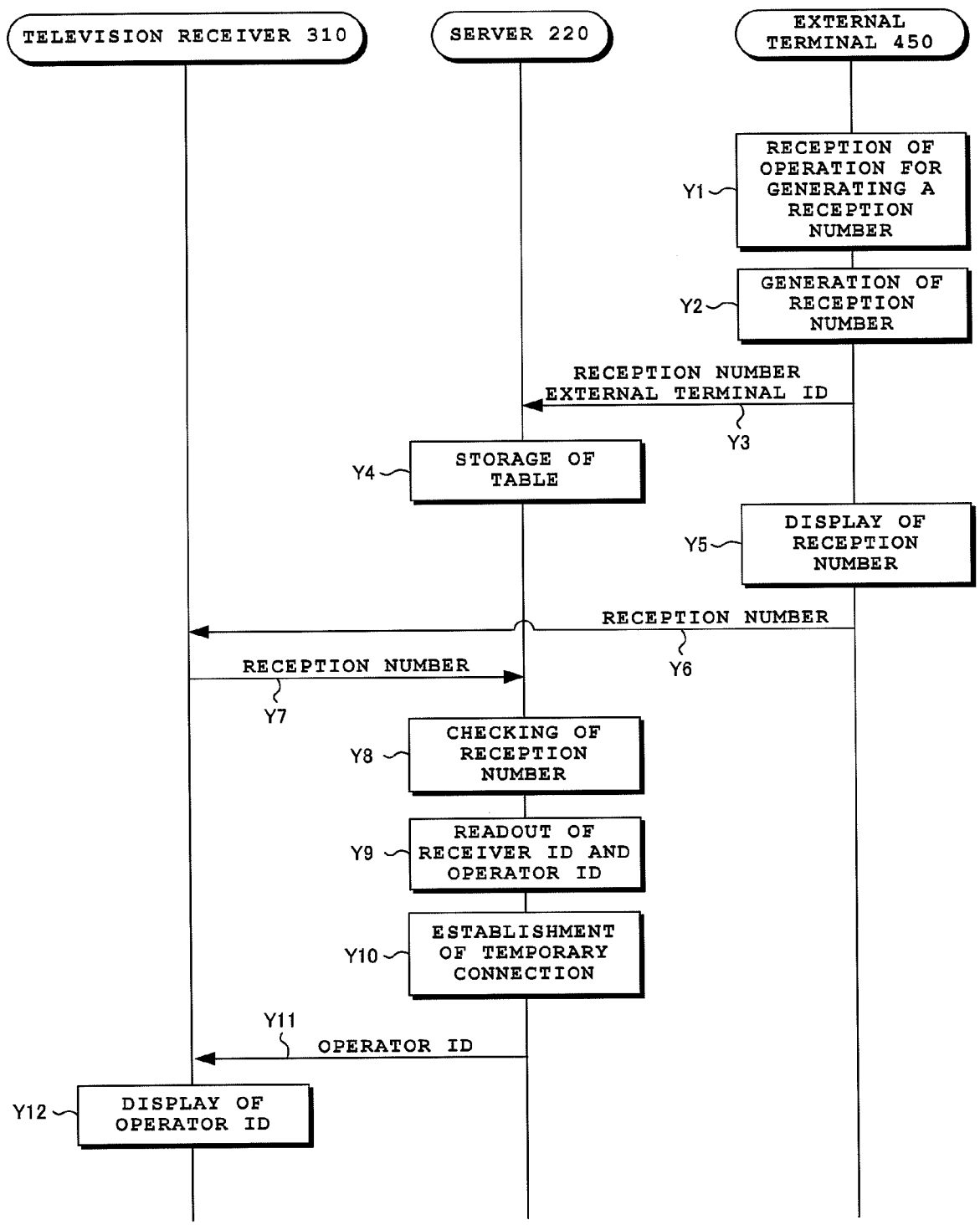
FIG. 21 is a sequence chart showing an example of the operation in the television receiver operational system according to Embodiment 5.

Described next is the operation of thus configured television receiver operational system 400. FIG. 21 is a sequence chart showing an example of the operation of the television receiver operational system 400. First, the external terminal 450 receives an operation of generating a reception number by the operator OP (step Y1). By this operation being performed, the external terminal 450 generates a reception number (key information) (step Y2). Then, the external terminal 450 transmits the reception number and external terminal identification information of the external terminal 450 to the server 220 (step Y3).

Upon receiving the reception number, the server 220 associates the reception number with the external terminal identification information as a table to store (step Y4). Meanwhile, the external terminal 450 displays the generated reception number in a section 452 (notifying section) to notify the operator OP (step Y5). Moreover, the operation of subsequent steps Y6 to Y12 is performed in the same way as in steps X8 to X14 of Embodiment 4. Thus, the operator OP is allowed to remotely operate the television receiver.

In addition, the Embodiments as described above enable the operation of the television receiver by the external terminal, but substituting for the above-mentioned operation, the external terminal may transmit a file for settings to cause the television receiver to execute collective settings.

Further, the above-mentioned Embodiments use mainly a telephone as the conveyance means T, and further, enable display of a reception number to be conveyed directly using a videophone. In this case, it is possible to decrease the possibility such as user's wrong viewing, operator OP's wrong hearing and the like. Further, data of a photograph taken by a camera may be sent by e-mail or the like. The same effect is obtained also in this case. Moreover, a user may describe a reception number in a message of an e-mail to transmit. Alternately, a speech signal issued from a speaker may be conveyed directly to an operator OP by telephone. In these ways, it is possible to decrease the risk of wrong saying and wrong hearing. Further, a sound signal such as a push tone or the like may be conveyed by telephone to be input directly to the external terminal 150.

The invention claimed is:

1. A television receiver operable via a network, comprising:
   a notifying section that notifies a user of key information for specifying an operational request of the television receiver; and
   a receiver-side transmitting/receiving section that receives connection confirmation information confirming that temporary connection between the television receiver and an external device has been established when the television receiver and the external device are temporarily connected based on the key information,
   wherein the notifying section notifies the user of the received connection confirmation information so as to enable the television receiver to be operated from the external device by the establishment of real connection with the external device when the connection confirmation based on the connection confirmation information notified to the user is made.

2. The television receiver according to claim 1, further comprising:
   an operational section that receives a confirmation operation made by the user confirming the connection confirmation information with the operator intending to operate the television receiver from the external device; and
   a receiver-side control section which establishes real connection with the external device when the confirmation operation is made, and executes operational instructions received from the external device.

3. The television receiver according to claim 1, further comprising:
   a request generating section that generates request information to request the key information from a server in response to a predetermined operation by the user, wherein
   the receiver-side transmitting/receiving section transmits the request information to the server and receives the key information generated by the server in response to the request information, and
   based on the received key information, the temporary connection with the external device is established.

4. The television receiver according to claim 1, further comprising:
   a key information generating section that generates the key information in response to a predetermined operation by the user,
   wherein the receiver-side transmitting/receiving section transmits the generated key information to a server, and
   based on the generated key information, the temporary connection with the external device is established.

5. The television receiver according to claim 1, wherein the receiver-side transmitting/receiving section transmits the key information input by the user to a server, and
   the temporary connection with the external device is established corresponding to an external terminal ID specified by the input key information.

6. A server enabling a television receiver to be operated from an external device via a network, comprising:
a temporary connection establishing section that establishes temporary connection between the external device and a television receiver corresponding to key information specifying an operation request of the television receiver, based on the key information, when receiving the key information from the external device to operate the television receiver;
a server-side transmitting/receiving section that transmits, to the television receiver corresponding to the key information, connection confirmation information for confirming the temporary connection between the television receiver and the external device has been established; and
a real connection establishing section which receives confirmation finish information indicating that the connection confirmation information has been confirmed, and when determining that the connection is valid by the confirmation finish information, switches the temporary connection between the external device and the television receiver corresponding to the key information to real connection to establish the real connection.

7. The server according to claim 6, further comprising:
a temporary connection information storing section that associates the received key information with the connection confirmation information to be transmitted to store as temporary connection information when the temporary connection is made; and
a real connection information storing section that associates the received key information with the connection confirmation information to be transmitted to store as real connection information when the real connection is made,
wherein when receiving the confirmation finish information, the real connection establishing section deletes the temporary connection information from the temporary connection information storing section, and stores the real connection information in the real connection information storing section.

8. The server according to claim 7, wherein the temporary connection information storing section stores a corresponding temporary connection ID for each of the temporary connection information, and
the real connection establishing section transmits the temporary connection information to a television receiver identified by the receiver ID as the connection confirmation information.

9. The server according to claim 6, further comprising:
a key information storing section that stores key information in association with a receiver ID to identify the receiver; and
an operator ID storing section that stores an operator ID in association with an external terminal ID to identify an external terminal as the external device,
wherein the temporary connection establishing section refers to the key information storing section to establish temporary connection between the television receiver and the external terminal, and
transmits the operator ID as the connection confirmation information to the television receiver identified by the receiver ID by referring to the operator ID storing section.

10. A server enabling a television receiver to be operated from an external device via a network, comprising:
a temporary connection establishing section that establishes temporary connection between the external device and a television receiver that transmits key information specifying an operation request of the television receiver, based on the key information, when receiving the key information from the television receiver to operate the television receiver;
a server-side transmitting/receiving section that transmits, to the television receiver transmitting the key information, connection confirmation information for confirming the temporary connection between the television receiver and the external device has been established; and
a real connection establishing section which receives confirmation finish information generated after confirming the connection confirmation information, and when determining that the connection is valid by the confirmation finish information, switches the temporary connection between the external device and the television receiver transmitting the key information to real connection to establish the real connection.

11. The server according to claim 10, further comprising:
a temporary connection information storing section that associates the received key information with the connection confirmation information to be transmitted to store as temporary connection information when the temporary connection is made; and
a real connection information storing section that associates the received key information with the connection confirmation information to be transmitted to store as real connection information when the real connection is made,
wherein when receiving the confirmation finish information, the real connection establishing section deletes the temporary connection information from the temporary connection information storing section, and stores the real connection information in the real connection information storing section.

12. The server according to claim 11, wherein the temporary connection information storing section stores a corresponding temporary connection ID for each of the temporary connection information, and
the real connection establishing section transmits the temporary connection information to a television receiver identified by the receiver ID as the connection confirmation information.

13. The server according to claim 10, further comprising:
a key information storing section that stores key information in association with a receiver ID to identify the television receiver; and
an operator ID storing section that stores an operator ID in association with an external terminal ID to identify an external terminal as the external device,
wherein the temporary connection establishing section refers to the key information storing section to establish temporary connection between the television receiver and the external terminal, and
transmits the operator ID as the connection confirmation information to the television receiver identified by the receiver ID by referring to the operator ID storing section.

14. A television receiver operational system comprised of an element group of a television receiver, a server, and external device,
wherein the server comprises
a temporary connection establishing section that establishes temporary connection between the external device and a television receiver corresponding to key information specifying an operation request of the television receiver, based on the key information, when receiving the key information from the television receiver, a real connection establishing section which receives confirmation finish information for confirming the temporary connection is valid, and when determining that the connection is valid by the confirmation finish information, switches the temporary connection to real connection to establish the real connection, and a server-side transmitting/receiving section that transmits the connection confirmation information to the television receiver, and wherein the television receiver comprises a notifying section that notifies a user of the connection confirmation information received in the temporary connection, wherein when the connection confirmation information is confirmed between the user and the operator, and the server receives confirmation finish information transmitted from the television receiver or the external device and determines that the connection is valid by the confirmation finish information, the server switches the temporary connection to real connection to establish the real connection.

15. The television receiver operational system according to claim 14, wherein the server receives the key information from the external device.

16. A non-transitory computer readable medium storing a television receiver operational program that is a program executed by a server that mediates connection between a television receiver and external device, including:

temporary connection establishing processing for establishing temporary connection between the external device and a television receiver based on key information specifying an operation request of the television receiver, when the server receives the key information to operate the television receiver;

transmitting processing for transmitting, to the television receiver corresponding to the key information, connection confirmation information for confirming the temporary connection between the television receiver and the external device has been established; and real connection establishing processing for receiving confirmation finish information generated after confirming the connection confirmation information, and when determining that the connection is valid by the connection finish information, switching the temporary connection between the external device and the television receiver to real connection to establish the real connection.

17. The television receiver operational program according to claim 16, wherein the server receives the key information from the external device.

* * * * *